United States Patent
Kim et al.

(10) Patent No.: US 10,635,143 B2
(45) Date of Patent: Apr. 28, 2020

(54) METHOD AND ELECTRONIC DEVICE FOR CONTROLLING EXTERNAL ELECTRONIC DEVICE THROUGH ELECTROMAGNETIC SIGNAL

(71) Applicant: Samsung Electronics Co., Ltd., Suwon-si, Gyeonggi-do (KR)

(72) Inventors: Hankon Kim, Suwon-si (KR); Jinchul Choi, Suwon-si (KR); Sangwoo Yu, Suwon-si (KR); Heeseung Choi, Suwon-si (KR); Daegi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/276,406

(22) Filed: Feb. 14, 2019

(65) Prior Publication Data

US 2019/0250678 A1 Aug. 15, 2019

(30) Foreign Application Priority Data

Feb. 14, 2018 (KR) ........................ 10-2018-0018747

(51) Int. Cl.
*G06F 1/16* (2006.01)
*G06F 3/0354* (2013.01)
(Continued)

(52) U.S. Cl.
CPC ........ *G06F 1/1698* (2013.01); *G06F 3/03547* (2013.01); *G06F 3/04847* (2013.01); *G06F 9/3004* (2013.01); *H01Q 1/243* (2013.01)

(58) Field of Classification Search
CPC ............... G06F 1/1698; G06F 3/03547; G06F 3/04874; G06F 3/046; G06F 3/041;
(Continued)

(56) References Cited

U.S. PATENT DOCUMENTS 8,515,496 B2 * 8/2013 Cheng ................... H01Q 1/243
455/562.1
8,542,145 B2 * 9/2013 Galati .................. G01S 13/878
342/107

(Continued)

FOREIGN PATENT DOCUMENTS

KR 10-2016-0000330 A 1/2016

OTHER PUBLICATIONS

International Search Report dated May 28, 2019 in connection with International Patent Application No. PCT/KR2019/001852, 3 pages.

(Continued)

*Primary Examiner* — Magdi Elhag

(57) ABSTRACT

An electromagnetic wave sensing electronic device includes: a communication module configured to communicate with an external electronic device; at least one electromagnetic wave reception antenna configured to detect an electromagnetic signal generated from the external electronic device; a memory; and at least one processor, wherein the memory stores instructions causing the processor to, when executed, receive the electromagnetic signal, when the received electromagnetic signal has a predetermined range intensity or a predetermined range frequency characteristic, analyze the received electromagnetic signal, identify the external electronic device, based at least on the analysis result, identify a type of the electromagnetic signal, based at least one the analysis result, determine a proximity location between the electronic device and the external electronic device, based at least on the identified type of the electromagnetic signal, identify one or more predetermined functions corresponding to the determined proximity location, and perform the one or more predetermined functions.

18 Claims, 20 Drawing Sheets

(51) Int. Cl.
*H01Q 1/24* (2006.01)
*G06F 3/0484* (2013.01)
*G06F 9/30* (2018.01)

(58) Field of Classification Search
CPC ...... G06F 3/044; G06F 3/0416; G06F 9/3004; H01Q 1/243; H04L 67/104; H04W 4/30; H04W 4/35; H04W 4/50; H04W 4/70; H04W 4/80
See application file for complete search history.

(56) References Cited

U.S. PATENT DOCUMENTS

| | | | | |
|---|---|---|---|---|
| 9,483,129 | B1* | 11/2016 | Holsen | G06F 3/03545 |
| 9,793,952 | B1* | 10/2017 | Bogdanovich | H01L 51/0073 |
| 10,057,700 | B2* | 8/2018 | Proctor, Jr. | H04N 5/268 |
| 2012/0192269 | A1 | 7/2012 | Canet | |
| 2015/0048846 | A1 | 2/2015 | Post et al. | |
| 2015/0327309 | A1 | 11/2015 | Gardenfors | |
| 2015/0358337 | A1 | 12/2015 | Keller | |
| 2016/0050032 | A1 | 2/2016 | Emerson et al. | |
| 2016/0358013 | A1* | 12/2016 | Carter | H04W 4/023 |
| 2017/0180899 | A1* | 6/2017 | Proctor, Jr. | H04N 5/268 |
| 2018/0233047 | A1* | 8/2018 | Mandeville-Clarke | B62D 15/0255 |
| 2019/0041845 | A1* | 2/2019 | Cella | H04L 1/0002 |
| 2019/0086470 | A1* | 3/2019 | Shake | G01R 31/3025 |
| 2019/0141444 | A1* | 5/2019 | Lee | H04R 3/005 |

OTHER PUBLICATIONS

Written Opinion of the International Searching Authority dated May 28, 2019 in connection with International Patent Application No. PCT/KR2019/001852, 7 pages.

* cited by examiner

METHOD AND ELECTRONIC DEVICE FOR CONTROLLING EXTERNAL ELECTRONIC DEVICE THROUGH ELECTROMAGNETIC SIGNAL

CROSS-REFERENCE TO RELATED APPLICATION(S)

The present application is related to and claims benefit under 35 U.S.C. § 119(a) of Korean patent application filed on Feb. 14, 2018 in the Korean Intellectual Property Office and assigned Serial number 10-2018-0018747, the entire disclosure of which is hereby incorporated by reference.

BACKGROUND

1. Field

The present disclosure relates to a method and an electronic device for controlling an external electronic device on the basis of an electromagnetic signal.

2. Description of Related Art

The above information is presented as background information only to assist with an understanding of the present disclosure. No determination has been made, and no assertion is made, as to whether any of the above might be applicable as prior art with regard to the present disclosure.

Recently, interest in a connectivity function of exchanging information between electronic devices connecting electronic devices to provide a service according to a situation to a user has increased. The connectivity function is a function of making and executing a connection between electronic devices through short-range communication technology such as near field communication (NFC) or Bluetooth (BT)/Wi-Fi.

SUMMARY

In order to activate a connectivity function between electronic devices, a user is required to perform an operation of entering a particular mode for bidirectional information communication, an operation of selecting an external electronic device for bidirectional communication, an operation of making a request for performing a particular function, and an operation of gradually controlling two electronic devices according to a defined rule. Due to the performance of various operations, the user is required to provide input through a UI or a graphic user interface (GUI) in each operation stage, so that the user may feel cumbersomeness or inconvenience in using the electronic device. Further, users who are not skilled at the connectivity function between electronic devices may not use the connectivity function because of complex connection operation.

According to various embodiments, the electronic device may provide a method of reducing UI or GUI stages and intuitively executing predetermined functions by simplifying a series of complex operations which should be performed through several stages to allow users to easily use the connectivity function.

According to various embodiments, the electronic device includes: a communication module configured to wirelessly communicate with an external electronic device; at least one electromagnetic wave reception antenna configured to detect an electromagnetic signal generated from the external electronic device, a memory; and at least one processor electrically connected to the communication module, the at least one electromagnetic wave reception module, and the memory, wherein the memory stores instructions causing the processor to, when executed, receive the electromagnetic signal through the at least one electromagnetic wave reception antenna, when the received electromagnetic signal has a predetermined range intensity or a predetermined range frequency characteristic, analyze the received electromagnetic signal, identify the external electronic device, based at least on the analysis result, identify a type of the electromagnetic signal, based at least one the analysis result, determine a proximity location between the electronic device and the external electronic device, based at least on the identified type of the electromagnetic signal, identify one or more predetermined functions corresponding to the determined proximity location, and perform the one or more predetermined functions.

According to various embodiments, a method of controlling an external electronic device, based on an electromagnetic signal, by an electronic device, the method comprising; receiving an electromagnetic signal detected by proximity or contact between the electronic device and the external electronic device, identifying the external electronic device by analyzing the received electromagnetic signal, identifying a type of the electromagnetic signal, based on a result of the analysis of the electromagnetic signal, determining a proximity or contact location between the electronic device and the external electronic device, based on the identified type of the electromagnetic signal and identifying one or more predetermined functions corresponding to the determined proximity or contact location and performing the one or more predetermined functions.

According to various embodiments, an electromagnetic wave sensing electronic device may execute a predetermined connectivity function through one touch or tag contact without gradual entry operations for the connectivity function between electronic devices. Further, according to various embodiments, the electronic device may execute different connectivity functions in response to sensing of the electromagnetic signal according to the location by distinguishing the electromagnetic signal detected at the location (for example, top, bottom, left, and right) of the external electronic device, thereby increasing user convenience.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

Figure 1:
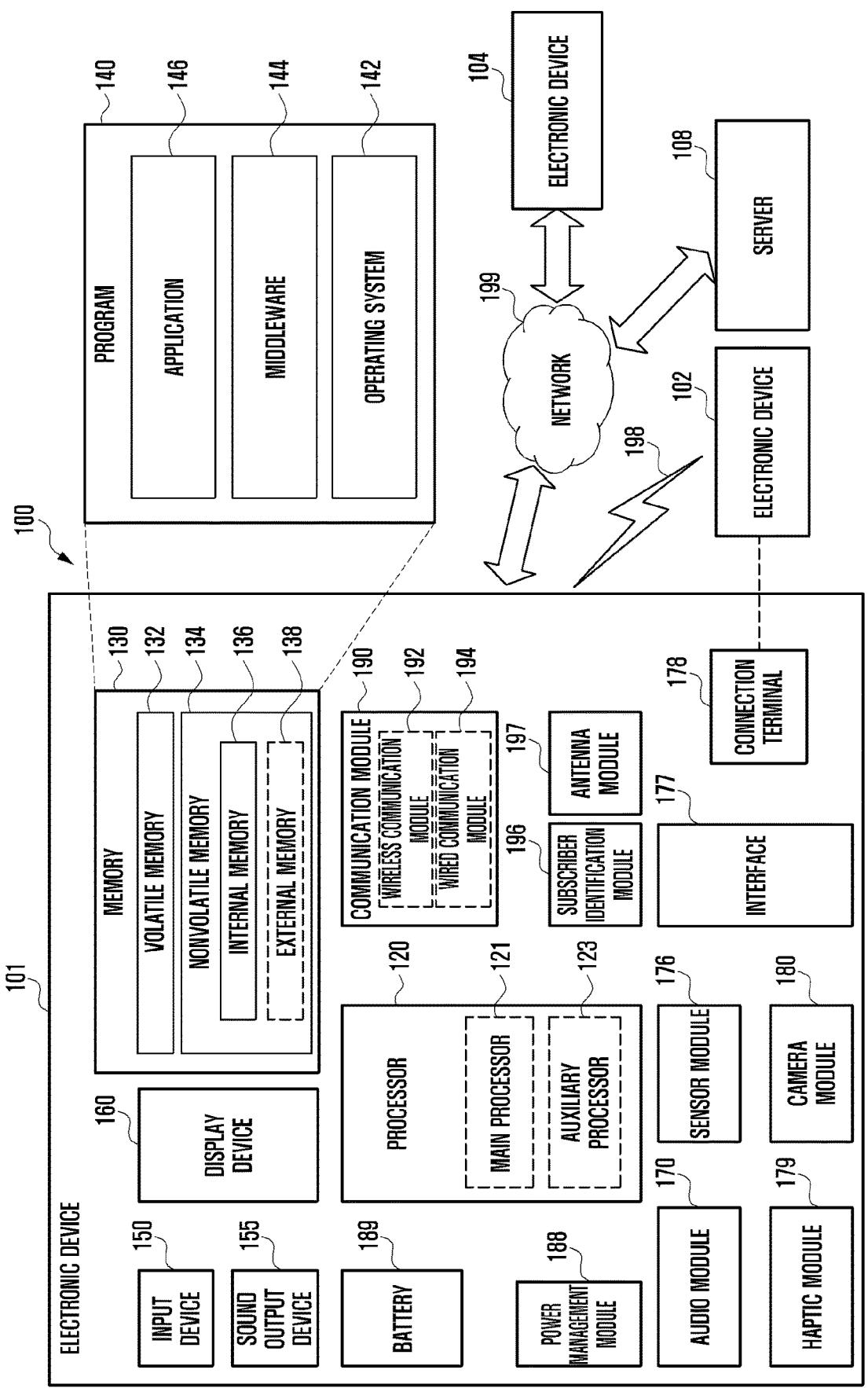
FIG. 1 is a block diagram illustrating an electronic device 101 in a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
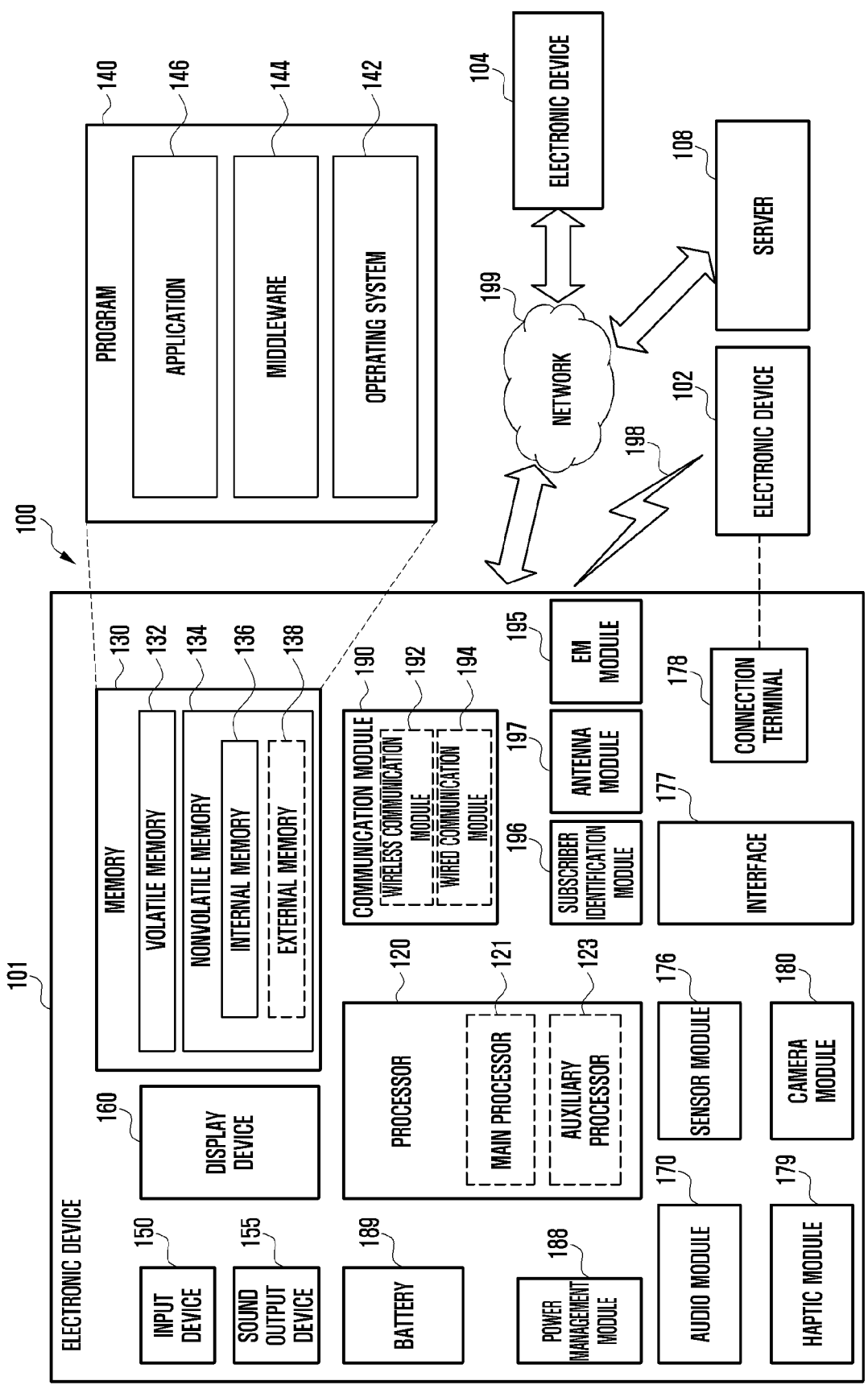
FIG. 2 is a block diagram illustrating an electromagnetic wave sensing electronic device according to various embodiments of the present disclosure.

FIG. 2 is a block diagram illustrating an electromagnetic wave sensing electronic device according to various embodiments of the present disclosure.

Referring to FIG. 2, an electromagnetic wave sensing electronic device 101 according to various embodiments may include a separate EM module 195 (electromagnetic wave sensing module) as well as the elements of the electronic device in FIG. 1. The EM module 195 may be implemented as a chip separated from the communication module 190 but may be implemented as at least a part of the communication module 190. Hereinafter, elements in FIG. 2 perform the same functions and/or operations as the elements illustrated in FIG. 1, so that a detailed description thereof will be omitted.

The EM module 195 may be connected to the processor 120, and may receive electromagnetic signal of the external electronic device 102 or 104 and transmit the received electromagnetic signals to the processor 120.

According to various embodiments, the EM module 195 may receive electromagnetic signal of the external electronic device 102 or 104 through antennas, generate data based on the electromagnetic signals, and transmit the generated data to the application processor 120.

According to various embodiments, the EM module 195 may determine whether the electromagnetic signals meet a predetermined condition, and when the electromagnetic signals meet the predetermined condition, transmit at least one piece of a wake-up signal for waking up the processor 120 and the data based on the electromagnetic signals to the processor 120. For example, the EM module 195 may transmit the wake-up signal to the processor 120 in response to a condition under which the electromagnetic signal received through the antenna while the processor 120 operates in an inactive mode (or a sleep mode) has an intensity in a predetermined range or larger or has a frequency characteristic included in a predetermined range. The EM module 190 may transmit the data generated on the basis of the electromagnetic signals to the processor 120 in an active state.

According to various embodiments, the processor 120 may analyze electromagnetic signal generated by the external electronic device 102 or 104 through the EM module 195 and identify types of the electromagnetic signals on the basis of the electromagnetic signal of the external electronic device 102 or 104.

The processor 120 may determine a proximity location between the electronic device 101 and the external electronic device 102 or 104 on the basis of at least one of the identified types of the electromagnetic signals and an arrangement location of the electromagnetic wave reception antenna.

For example, a unique electromagnetic signal may be generated in a predetermined range at each location of at least one of the external electronic devices 102 and 104. The electronic device 101 may compare the inherent electromagnetic signal generated by the external electronic device 102 or 104 with information stored in the electronic device (for example, device mapping information indicating mapping of a waveform characteristic for each type or mapping information for each location) and identify a contact/tag, touch, or proximity location between the electronic device 101 and the external electronic device 102 or 104.

In another example, the processor 120 may identify a proximity or contact location between the external electronic device and the electronic device by identifying the arrangement location of the reception antenna for receiving the electromagnetic signal.

The processor 120 may identify one or more functions (or control functions) predetermined to correspond to the determined proximity location. The processor 120 may perform control to execute the identified functions through at least some elements of the external electronic device 102 or 104. The electronic device may have different control functions for the connectivity function between devices depending on the contact location between devices or the waveform characteristic for each location. For example, when types of electromagnetic waves generated at four locations such as to top, bottom, left, and right or two locations are different like a TV, the electronic device may set a first control function corresponding to a first location (top), a second control function corresponding to a second location (bottom), a third control function corresponding to a third location (left), and a fourth control function corresponding to a fourth location (right).

Figure 3:
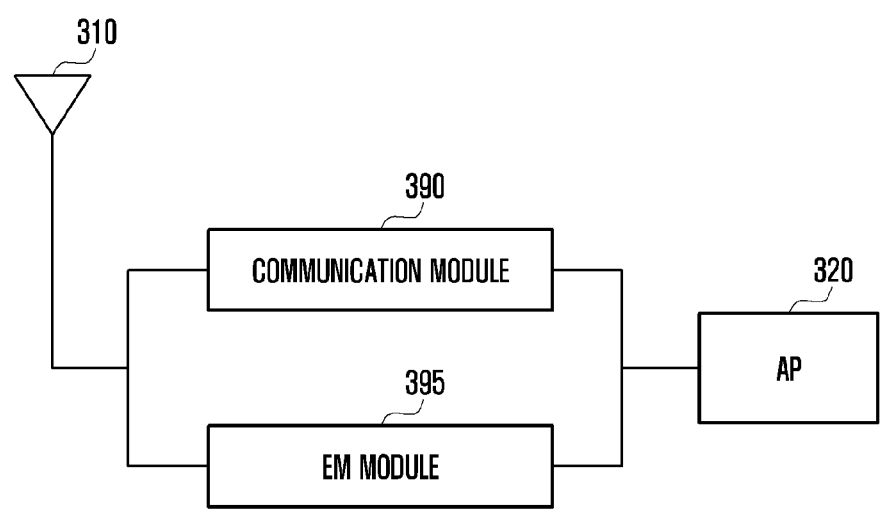
FIG. 3 illustrates the configuration of the electromagnetic wave sensing electronic device according to various embodiments.

FIG. 3 illustrates the configuration of the electromagnetic wave sensing electronic device according to various embodiments.

Referring to FIG. 3, the electromagnetic wave sensing electronic device (for example, the electronic device 101 in FIGS. 1 and 2) according to various embodiments may include an antenna 310, an application processor (AP) 320, a communication module 390, and an EM module 395 (for example, an electromagnetic wave sensing module). The electronic device 101 may be implemented to include at least some of the elements and/or functions of the electronic device 101 of FIGS. 1 and 2.

According to various embodiments, the antenna 310 may include at least one electromagnetic wave reception antenna or/and at least one transmission/reception antenna. The antenna 310 may be electrically connected to the communication module 390 and the EM module 395. The antenna 310 may transfer a received analog signal to the EM module 395 or the communication module 390 or transmit an analog signal received from the EM module 395 or the communication module 390 to the outside.

For example, the electromagnetic wave reception antenna may be implemented as at least one electromagnetic wave reception antenna by directly coating the housing appearance with a metal through radio-frequency transparent vacuum metallization (RTVM) technique. The electromagnetic wave reception antenna may be disposed at a location not to generate interference with other wireless communication modules in the electronic device, for example, a wireless charging coil and an antenna for NFC.

According to various embodiments, the EM module 395 may be independently implemented as a chip separated from the communication module 390. The EM module 395 may generate a sensing value on the basis of the electromagnetic signals of the external electronic devices (for example, the external electronic devices 102 and 104 of FIGS. 1 and 2) received through the antenna 310 and transfer the generated sensing value to the application processor 320. The EM module 395 may be implemented to include at least some of the elements and/or functions of the EM module 195 of FIG. 2.

EM module 395 may determine whether the electromagnetic signal received through the antenna 310 has an intensity in a predetermined range or wide or a frequency characteristic included in a predetermined range. The EM module 395 may transmit a sensing value based on the electromagnetic signal to the application processor 320 in response to a condition under which the electromagnetic signal has an intensity in a predetermined range or wide or a frequency characteristic included in a predetermined range.

According to various embodiments, the communication module 390 may support a function of communicating with the external electronic devices 102 and 104 through the antenna 310 on the basis of a communication signal. The communication module 390 may control transmission/reception of a search signal for searching for the external electronic devices 102 and 104, a connection request signal for making a request for a connection, a reception standby signal for waiting for reception of a communication signal from the external electronic devices, and a response signal for approving a connection request.

The communication module 390 may support a communication connection with the external electronic device 102 or 104 in proximity to or in contact with the electronic device 101 under the control of the application processor 320. The communication module 390 may transmit command information for executing a predetermined function (or a control function) to the external electronic device 102 or 104 through at least a part of the external electronic device 102 or 104 under the control of the application processor 320. The communication module 390 may include at least some of the elements and functions of the communication module 190 of FIG. 1 and FIG. 2. The communication module 190 may include at least one of Wi-Fi, light fidelity (Li-Fi), Bluetooth, Bluetooth low energy (BLE), ZigBee, near field communication (NFC), magnetic secure transmission, radio frequency (RF), and body area network (BAN), but is not limited thereto.

The application processor 320 may process calculations and data executed within the electronic device. The operations of the application processor 320 may be performed by loading instructions stored in the memory (for example, the memory 130 of FIG. 1). The application processor 320 may include at least some of the elements and/or functions of the processor 120 of FIGS. 1 and 2.

The application processor 320 may identify the external electronic device 102 or 104 by analyzing the electromagnetic signal or data generated on the basis of the electromagnetic signal. The application processor 320 may determine the proximity location between the electronic device 101 and the external electronic device 102 or 104 by analyzing the electromagnetic signal or the sensing value generated on the basis of the electromagnetic signal. The application processor 120 may identify one or more predetermined functions (or control functions) corresponding to the determined proximity location.

According to various embodiments, the application processor 120 may identify reception of the electromagnetic signal which meets a predetermined condition and control the communication module 390 to perform the communication connection with the external electronic devices. After the communication connection with the external electronic device 102 or 104, the application processor 320 may transfer a control function for controlling the external electronic device 102 or 104 through the communication module 390 in accordance with the function identified by the analysis of the electromagnetic signal.

Figure 4:
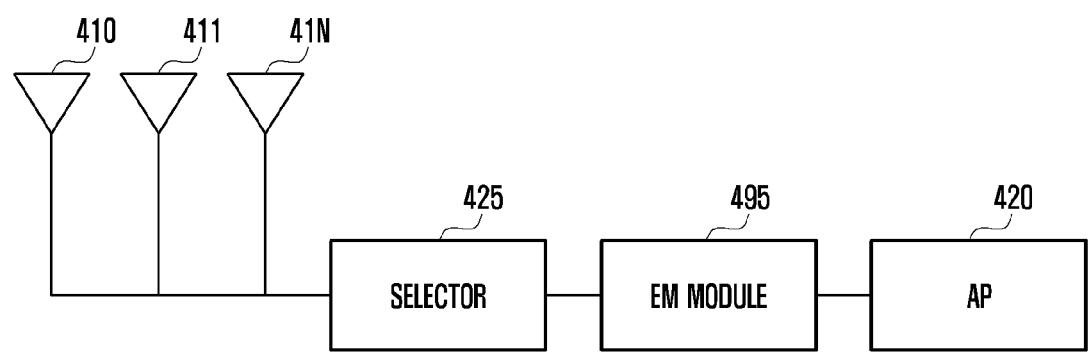
FIG. 4 illustrates the configuration of the electromagnetic wave sensing electronic device according to various embodiments.

FIG. 4 illustrates the configuration of the electromagnetic wave sensing electronic device according to various embodiments.

Referring to FIG. 4, the electromagnetic wave sensing electronic device (for example, the electronic device 101 in FIGS. 1 and 2) according to various embodiments may include antennas 410, 411 . . . 41N, an Application Processor (AP) 420, and an EM module 495 (for example, an electromagnetic wave sensing module). The electronic device 101 may be implemented to include at least some of the elements and/or functions of the electronic device 101 of FIGS. 1 and 2.

According to various embodiments, the antennas 410, 411 . . . 41N may include one or more electromagnetic wave reception antennas. The antennas 410, 411 . . . 41N may be electrically connected to a selector 425 and may transfer an analog signal received through the selector 425 to the EM module 495. The EM module 495 may be implemented to include at least some of the elements and/or functions of the EM module 195 of FIG. 2. The EM module 495 may include the communication module of FIG. 3, but is not limited thereto.

The selector 425 may include one or more input terminals connected to respective electromagnetic wave reception antennas and one or more output terminals connected to the EM module 495. The selector 425 may transfer the electromagnetic signal to the EM module 495 through the output terminal connected to the input terminal connected to one of the antennas 410, 411 . . . 41N.

The EM module 495 may determine whether the electromagnetic signal received through antennas 410, 411 . . . 41N has an intensity in a predetermined range or larger or has a frequency characteristic included in a predetermined range. The EM module 495 may transfer data based on the electromagnetic signal to the application processor 420 in response to a condition under which the electromagnetic signal has an intensity in a predetermined range or larger or a frequency characteristic included in a predetermined range. The EM module 495 may be implemented to include at least some of the elements and/or functions of the EM module 195 of FIG. 2.

According to an embodiment, the EM module 495 may identify the arrangement location of the antennas 410, 411 . . . 41N through the electromagnetic signals received through the selector 425. The EM module 495 may identify where the antennas 410, 411 . . . 41N for receiving the electromagnetic signals are arranged in the electronic device 101 on the basis of the location of the input terminals for receiving the electromagnetic signals. For example, the electronic device 101 may store matching information on the arrangement location of the input terminals and the antennas 410, 411 . . . 41N.

The application processor 420 may process calculations and data which can be executed within the electronic device 410. The operations of the application processor 420 may be performed by loading instructions stored in the memory (for example, the memory 130 of FIGS. 1 and 2). The application processor 420 may include at least some of the elements and/or functions of the processor 120 of FIGS. 1 and 2.

According to various embodiments, the application processor 420 may identify the external electronic device 102 or 104 by analyzing the electromagnetic signals or the sensing value generated on the basis of the electromagnetic signals.

According to various embodiments, the application processor 120 may identify the arrangement location of the antennas 410, 411 . . . 41N on the basis of the electromagnetic signals received through the selector 425 and identify at least one predetermined function (or control function) corresponding to the arrangement location of the antennas 410, 411 . . . 41N.

The application processor 420 may identify reception of the electromagnetic signal which meets a predetermined condition and perform a communication connection with the external electronic device 102 or 104. The application processor 420 may control a communication function to provide a control command for controlling the external electronic devices to the external electronic devices 102 and 104 in accordance with the identified function through the analysis of the electromagnetic signals. The application processor 420 may control the identified function to be executed through at least one some elements of the external electronic device 102 or 104 for transmitting the electromagnetic signals. The application processor 420 may control the identified function to the executed through a link with the external electronic device 102 or 104 for transmitting the electromagnetic signals.

Hereinafter, detailed elements of the EM module will be described.

Figure 5:
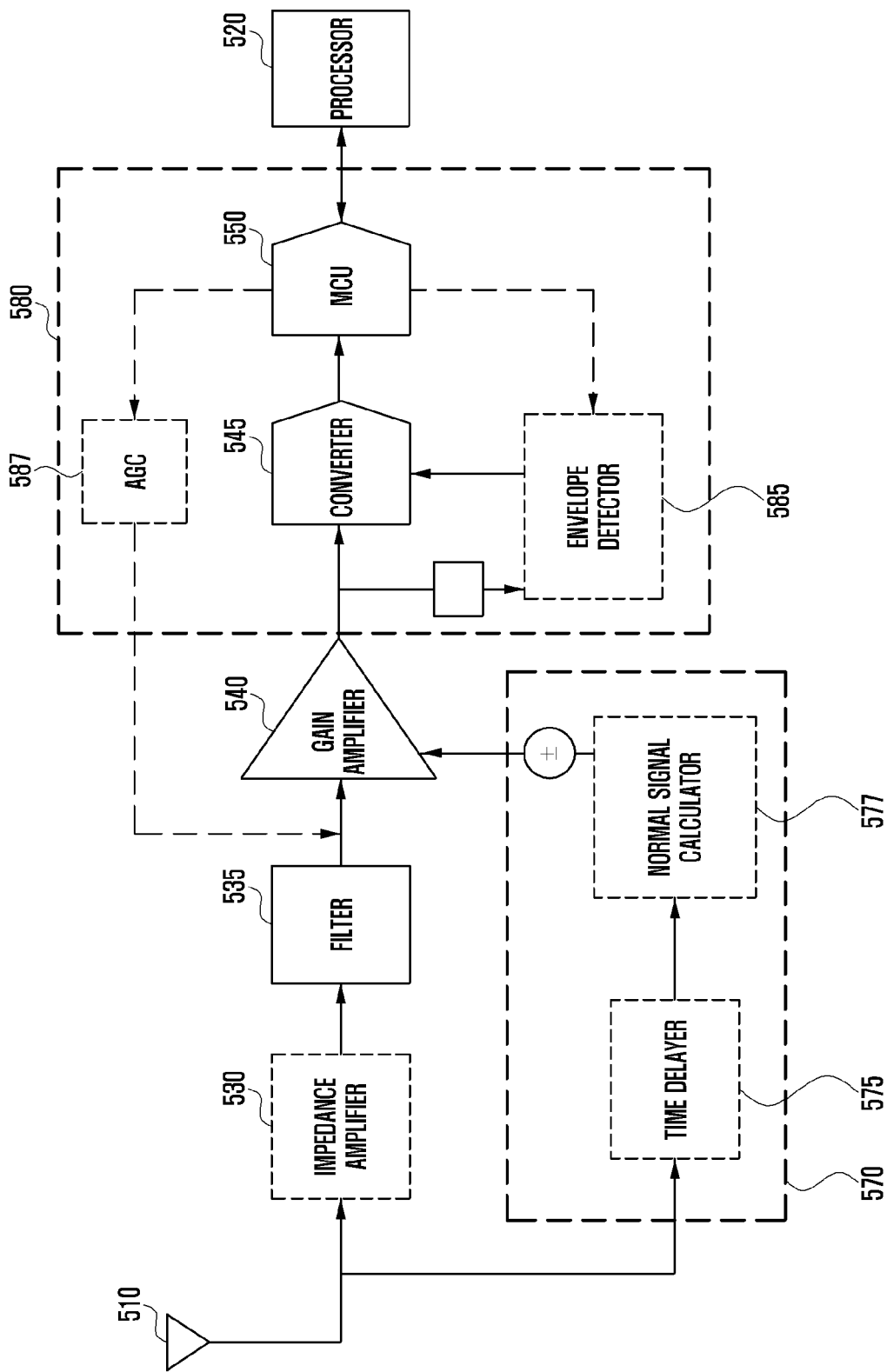
FIG. 5 illustrates the configuration of the EM module of the electromagnetic wave sensing electronic device according to various embodiments.

FIG. 5 illustrates the configuration of the EM module of the electromagnetic wave sensing electronic device according to various embodiments.

Referring to FIG. 5, according to an embodiment, the EM module (for example, the EM module 195 of FIG. 2, the EM module 395 of FIG. 3, or the electromagnetic wave sensing module) included in the electronic device (for example, the electronic device 101 of FIGS. 1 and 2) may include an electromagnetic wave reception antenna 510 for receiving an electromagnetic interference signal (EM signal), an impedance amplifier 530, a filter 535, a gain amplifier 540, a converter 545, and a micro controller unit (MCU) 550, and also include a first electromagnetic correction module 570 and a second electromagnetic correction module 580 for more precisely distinguishing sensing values for electromagnetic signals.

The electromagnetic wave reception antenna 510 may detect electromagnetic signal generated from the external electronic device (the external electronic device 102 or 104 of FIGS. 1 and 2). The electromagnetic wave reception antenna 510 may receive electromagnetic signal generated from the external electronic device 102 or 104 and transfer the electromagnetic signal to the impedance amplifier 530. The impedance amplifier 530 may convert a current signal received from the electromagnetic antenna 510 into a voltage signal and amplify the voltage signal. The signal amplified through the impedance amplifier 530 may be transferred to the filter 535. The filter 535 may include one or more filters and make a particular band signal pass therethrough. The particular band signal passing through the filter 535 may be transferred to the gain amplifier 540. The gain amplifier 540 may amplify an output signal compared to an input signal. The gain amplifier 540 may transfer the amplified output signal to the converter 545. The converter 545 may convert an analog signal into a digital signal. The converter 545 may transfer data converted into a digital signal for the electromagnetic signal to the MCU 550. The MCU 550 may calculate a sensing value of the electromagnetic signal received through the electromagnetic wave reception antenna and transfer the calculated sensing value to the application processor 520 of the electronic device 101 (the processor 120 of FIGS. 1 and 2, the application processor 320 of FIG. 3, or the application processor 420 of FIG. 4).

The MCU 550 may transfer the calculated sensing value of the electromagnetic signal to the processor 520 through at least one of the first electromagnetic correction module 570 and the second electromagnetic correction module 580. For example, the electromagnetic signal detected from the outside may be detected through the electromagnetic wave reception antenna 510, including an exception signal generated by an external factor as well as the electromagnetic signal (or a regular signal) transmitted from the external electronic device 102 or 104. The exception signal may include an abnormal signal, such as an instantaneous signal as well as an interval/repetitive/aperiodic normal signal having a predetermined time standard For example, the first electromagnetic correction module 570 may include a time delayer 575 and a normal signal calculator 577. The time delayer 575 may perform a time delay of the electromagnetic signal detected through the electromagnetic wave reception antenna 510 and then transfer the signal which has been amplified and filtered to the normal signal calculator 577. The normal signal calculator 577 may perform calculations such that the abnormal signal is added to or subtracted from the electromagnetic signal in order to distinguish the aperiodic normal signal and the abnormal signal. The electromagnetic signal from the abnormal signal is subtracted may be transferred to the gain amplifier 540 from the normal signal calculator 577 through the abnormal signal and may be reflected in the sensing value transferred to the processor 520.

In another example, the second electromagnetic correction module 580 may include an envelope detector 585 and an automatic gain control (AGC) 587. The envelope detector 585 may receive the signal amplified through the gain amplifier 540, perform demodulation to detect the envelope of the received electromagnetic signal, and transfer the detected signal to the converter 545. The converter 545 may convert a regular electromagnetic signal into a digital signal according to an electromagnetic waveform characteristic on the basis of the signal transmitted from the envelope detector 585, add and subtract an exception signal, and convert the envelope of the processed signal into a digital signal. When the exception signal is a normal signal, the ACG 587 may automatically control a gain to constantly maintain an output level and transfer the gain to the gain amplifier 540.

The MCU 550 may determine whether a predetermined condition is met on the basis of the sensing value of the electromagnetic signal corrected from the converter 545. For example, when the electromagnetic signal has an intensity in a predetermined range or larger or has a frequency characteristic included in a predetermined range, the MCU 550 may determine that analysis of the electromagnetic signal is easy and transfer the sensing value of the electromagnetic signal to the processor 520.

The MCU 550 may transfer a wake-up signal for waking up the processor 520 to the processor 520. When the processor 520 is an inactive mode (or a sleep mode), the processor 520 may switch to an active mode in response to the wake-up signal received from the MCU 550, and analyze and process the sensing value of the electromagnetic sensor received from the MCU 550.

According to various embodiments, the first electromagnetic correction module 570 and the second electromagnetic correction module 580 may be independently or individually included in the electronic device 101 or both thereof may be included therein.

According to various embodiments, the EM module may separate the electromagnetic signal received through the electromagnetic wave reception antenna 510 using at least one of the first electromagnetic correction module 570 and the second electromagnetic correction module 580 into sensing values having a plurality of waveform characteristics. Accordingly, the EM module 195 or 395 may divide the electromagnetic signal into first to Nth multiple sensing values and support separated execution of control functions of the electronic device and the external electronic devices in response to the multiple sensing values.

Figure 6:
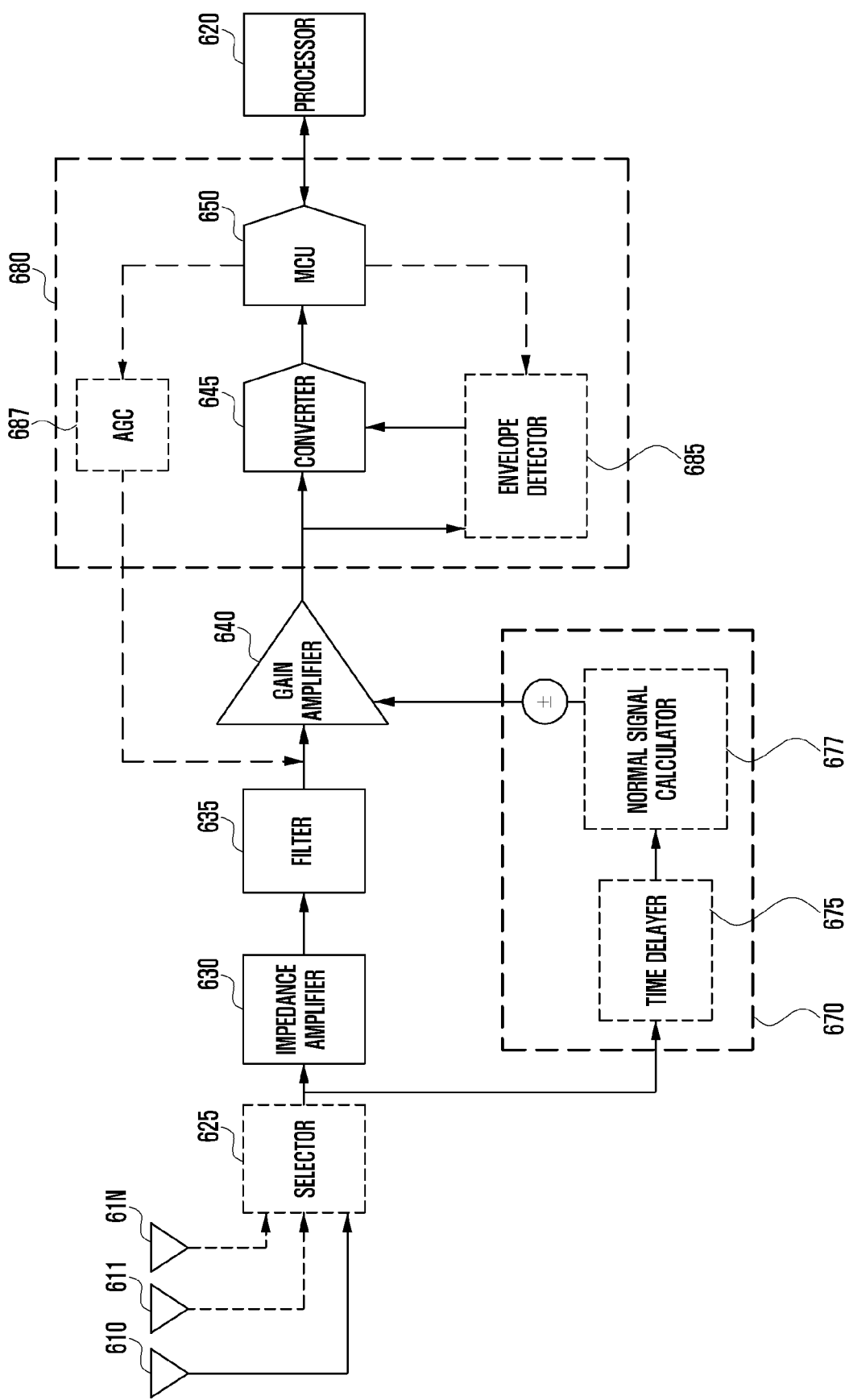
FIG. 6 illustrates the configuration of the EM module of the electromagnetic wave sensing electronic device according to various embodiments.

FIG. 6 illustrates the configuration of the EM module of the electromagnetic wave sensing electronic device according to various embodiments.

Referring to FIG. 6, according to an embodiment, the EM module (for example, the EM module 195 of FIG. 2, the EM module 495 of FIG. 4, or the electromagnetic wave sensing module) included in the electronic device (for example, the electronic device 101 of FIGS. 1 and 2) may include a plurality of electromagnetic wave reception antennas 610, 611 ... 61N for receiving electromagnetic interference signals (EM signals), a selector 625, an impedance amplifier 630, a filter 635, a gain amplifier 640, a converter 645, and a Micro Controller Unit (MCU) 650, and also include a first electromagnetic correction module 670 and a second electromagnetic correction module 680 for more precisely distinguishing sensing values for electromagnetic signals.

The plurality of electromagnetic wave reception antennas 610, 611 ... 61N may be disposed at different locations of the electronic device 101. The plurality of electromagnetic wave reception antennas 610, 611 ... 61N disposed at different locations may be connected to the selector 625 and may transfer electromagnetic signal transmitted by the selector 625 to the impedance amplifier 630. For example, the selector 625 may include one or more input terminals connected to respective electromagnetic wave reception antennas and one or more output terminals connected to the impedance amplifier 630 and the time delayer 675. The selector 625 may transfer the electromagnetic signal to the impedance amplifier 630 and the time delayer 675 through the output terminal connected to the input terminal connected to one of the antennas 610, 611 ... 61N.

The impedance amplifier 630 may convert a current signal received from the electromagnetic antennas 610, 611 ... 61N into a voltage signal and amplify the voltage signal. The signal amplified through the impedance amplifier 630 may be transferred to the filter 635. The filter 635 may include one or more filters and make a particular band signal pass therethrough. The particular band signal passing through the filter 635 may be transferred to the gain amplifier 640. The gain amplifier 640 may amplify an output signal compared to an input signal. The gain amplifier 640 may transfer the amplified output signal to the converter 645. The converter 645 may convert an analog signal into a digital signal. The converter 645 may transfer data converted into a digital signal for the electromagnetic signal to the MCU 650. The MCU 650 may calculate a sensing value of the electromagnetic signal transmitted through the electromagnetic wave reception antennas 610, 611 ... 61N and transfer the calculated sensing value to the processor of the electronic device (for example, the processor 120 of FIGS. 1 and 2, the application processor 320 of FIG. 3, or the application processor 420 of FIG. 4).

The MCU 650 may transfer the calculated sensing value of the electromagnetic signal to the processor 620 through at least one of the first electromagnetic correction module 670 and the second electromagnetic correction module 680. For example, the electromagnetic signal detected from the outside may be detected through the electromagnetic wave reception antennas 610, 611 ... 61N, including an exception signal generated by an external factor as well as an electromagnetic signal (or a regular signal) transmitted from the external electronic device 102 or 104. The exception signal may include an abnormal signal, such as an instantaneous signal as well as an interval/repetitive/aperiodic normal signal having a predetermined time standard.

For example, the first electromagnetic correction module 670 may include a time delayer 675 and a normal signal calculator 677. The time delayer 675 may perform a time delay of the electromagnetic signal detected through electromagnetic wave reception antennas 610, 611 ... 61N and then transfer the signal which has been amplified and filter to the normal signal calculator 677. The normal signal calculator 677 may perform calculations such that the abnormal signal is added to or subtracted from the electromagnetic signal in order to distinguish the aperiodic normal signal and the abnormal signal. The electromagnetic signal from the abnormal signal is subtracted may be transferred to the gain amplifier 640 from the normal signal calculator 677 through the abnormal signal and may be reflected in the sensing value transferred to the processor 620.

In another example, the second electromagnetic correction module 680 may include an envelope detector 685 and an automatic gain control (AGC) 687. The envelope detector 685 may receive the signal amplified through the gain amplifier 640, perform demodulation to detect the envelope of the received electromagnetic signal, and transfer the detected signal to the converter 645. The converter may convert a regular electromagnetic signal into a digital signal according to an electromagnetic waveform characteristic based on the signal transmitted from the envelope detector 685, process addition or subtraction of the exception signal, and convert the envelope of the processing signal into a digital signal. When the exception signal is a normal signal, the AGC 687 may automatically control to constantly maintain the output level and transfer the output level to the gain amplifier 640.

The MCU 650 may determine whether a predetermined condition is met on the basis of the sensing value of the electromagnetic signal corrected from the converter 645. For example, when the electromagnetic signal has an intensity in a predetermined range or larger or has a frequency characteristic included in a predetermined range, the MCU 650 may determine that analysis of the electromagnetic signal is easy and transfer the sensing value of the electromagnetic signal to the processor 620.

The MCU 650 may transfer a wake-up signal for waking up the processor 620 to the processor 620. The processor 620 may analyze and process the sensing value of the electromagnetic sensor transmitted from the MCU 650.

According to an embodiment, the MCU 650 may identify the arrangement location of the antennas 610, 611 . . . 61N through the electromagnetic signal transmitted through the selector 625. The MCU 650 may identify where the antennas 610, 611 . . . 61N for receiving the electromagnetic signal are located in the electronic device 101 on the basis of the location of the input terminal receiving the electromagnetic signal. The MCU 650 may transfer location information indicating which antenna 610, 611 . . . 61N receives the electromagnetic signal to the processor 620. The processor 620 may determine one predetermined function in order to control the external electronic device on the basis of the location information of the antenna.

According to various embodiments, the first electromagnetic correction module 670 and the second electromagnetic correction module 680 may be independently or individually included in the electronic device or both may be included in the electronic device.

Figure 7:
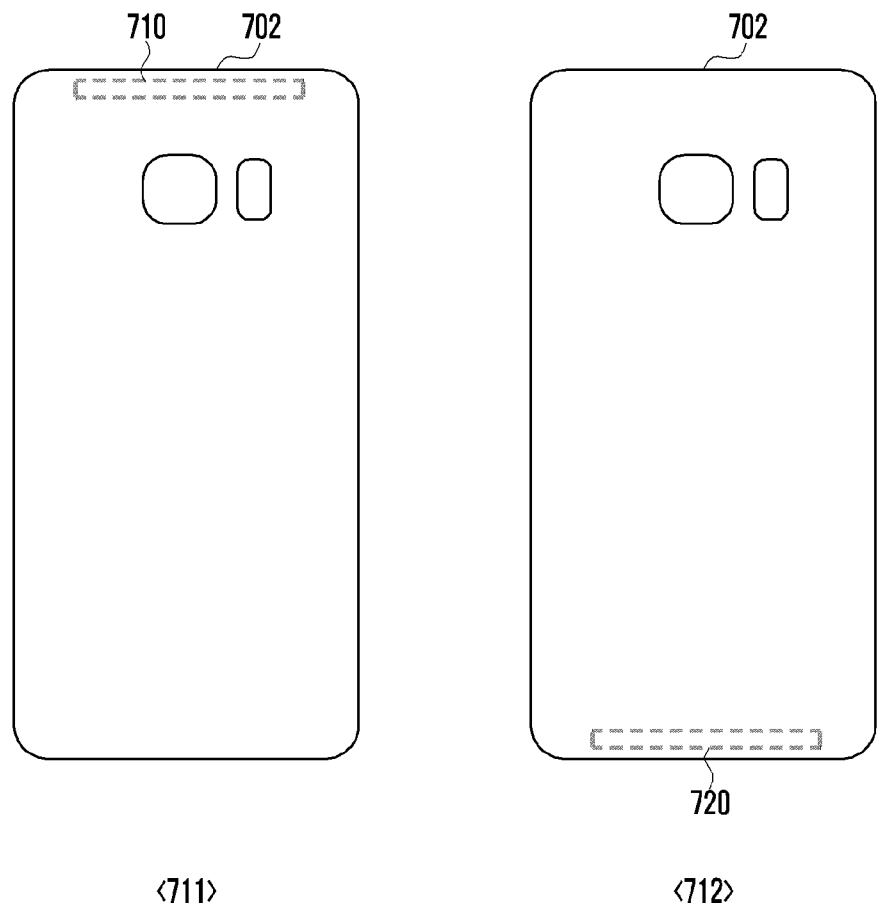
FIGS. 7 and 8 illustrate the electronic device including at least one electromagnetic wave reception antenna according to various embodiments.
Figure 8:
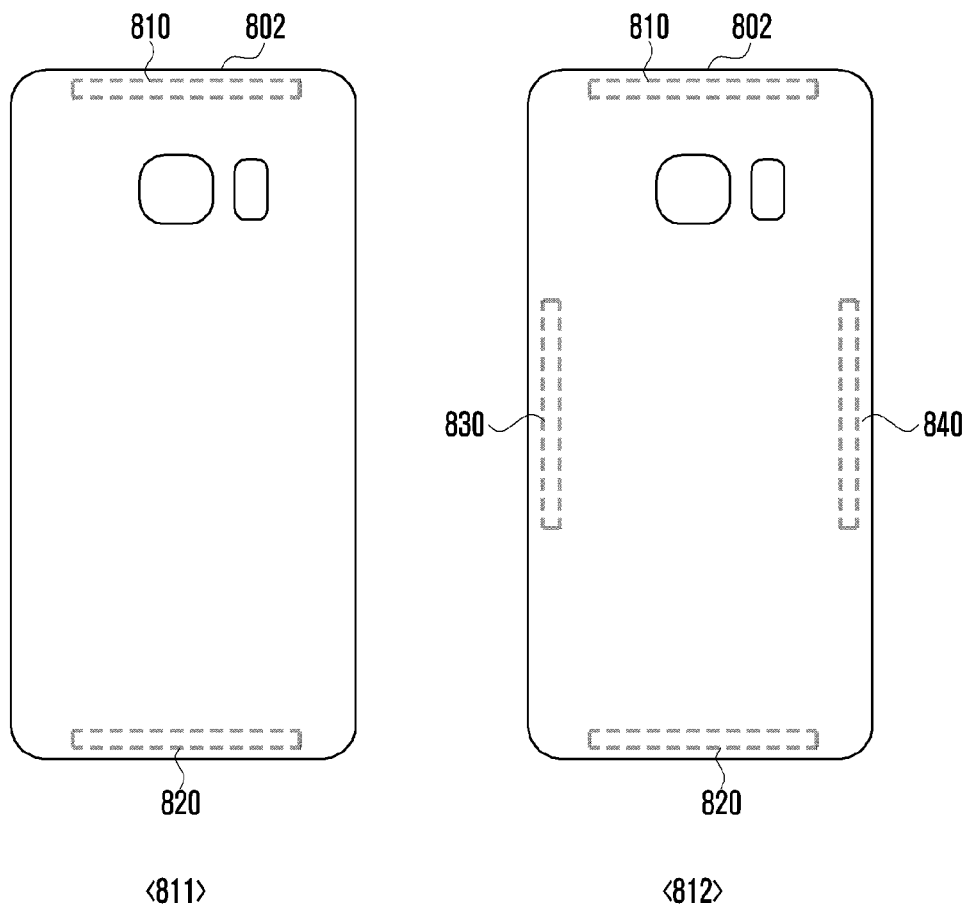

FIGS. 7 and 8 illustrate the electronic device including at least one electromagnetic wave reception antenna according to various embodiments. FIGS. 7 and 8 illustrate the rear surface of the electronic device and dotted areas are areas in which the electromagnetic wave reception antenna is disposed.

Referring to FIGS. 7 and 8, the electromagnetic sensing electronic device (for example, the electronic device 101 of FIGS. 1 and 2) according to various embodiments may include at least one electromagnetic wave reception antenna 710, 720, 810, 820, 830, and 840. The electronic device 101 may include elements included in the electronic device 101 and a housing 702 or 802 for protecting the elements.

At least one electromagnetic wave reception antenna 710, 720, 810, 820, 830, and 840 may be disposed within the housing 702 or 802 of the electronic device 101, particularly, to be adjacent to a bezel for reception sensitivity of electromagnetic waves. The user may make the electronic device 101 approach the external electronic device (the external electronic device 102 or 104 of FIGS. 1 and 2) in a direction in which the electromagnetic wave reception antennas are arranged, thereby making (or tag) the electronic device 101 be in proximity to or in contact with the external electronic device 102 or 104. When the electronic device 101 is in contact with or in proximity to the external electronic device in the direction in which the electromagnetic wave reception antennas are arranged, the electronic device 101 may detect electromagnetic waves generated from the external electronic device 102 or 104. When the electromagnetic signal has an intensity in a predetermined range or wide, the electronic device 101 may detect proximity or contact of the external electronic device 102 or 104 and analyze the electromagnetic signal transmitted from the electromagnetic wave reception antenna in response to the proximity or contact of the external electronic device 102 or 104.

For example, in the electronic device 101, one electromagnetic wave reception antenna 710 may be arranged in a direction of an upper bezel of the housing 702 as indicated by reference numeral 711. Alternatively, in the electronic device 101, one electromagnetic wave reception antenna 720 may be arranged in a direction of a lower bezel as indicated by reference numeral 712. Although not illustrated, when the electronic device 101 includes one electromagnetic wave reception antenna, the electromagnetic wave reception antenna may be arranged in a direction of a right bezel or a left bezel.

The user may make a request for controlling at least some functions of the external electronic device 102 or 104 through a link with the electronic device or through the electronic device by making the bezel of the housing 702 on which the electromagnetic wave reception antenna is arranged be in proximity to or in contact with the external electronic device 102 or 104.

The electronic device 101 may analyze the electromagnetic signal having a maximum value received from the external electronic device 102 or 104 through the electromagnetic wave reception antenna in accordance with detection of proximity of the external electronic device within a predetermined range or a condition of contact with the external electronic device. The electronic device 101 may identify the external electronic device 102 or 104 through the waveform characteristic of the electromagnetic signal. The electronic device 101 may be connected to the external electronic device 102 or 104 by making the connection for the connectivity function with the identified external electronic device 102 or 104. The electronic device 101 may identify a predetermined connectivity function corresponding to the identified external electronic device 102 or 104 and make a request for an execution command of a predetermined control function to the external electronic device 102 or 104. Then, the external electronic device 102 or 104 may execute the requested control function through a link with the electronic device 101 according to the execution command of the electronic device 101.

In another example, the electronic device 101 may include a plurality of electromagnetic wave reception antennas and may configure different connectivity functions depending on the reception location of the electromagnetic wave reception antenna. In the electronic device 101, electromagnetic wave reception antennas 810 and 820 may be arranged in directions of an upper bezel and a lower bezel of the housing 802 as indicated by reference numeral 811. In the electronic device 101, four electromagnetic wave reception antennas 810, 820, 830, and 840 may be arranged in directions of upper, lower, left, and right bezels as indicated by reference numeral 812.

The electronic device 101 may identify the arrangement location of the antennas through the electromagnetic signal and determine a predetermined control function in order to control the external electronic device in accordance with the arrangement location of the antennas. For example, when the user makes the external electronic device be in proximity to or in contact with the upper bezel of the housing 802, the electronic device 101 may make a request for an execution command of a first function to the external electronic device 102 or 104 in response to the electromagnetic signal transferred from the electromagnetic wave reception antenna 810 arranged in the direction of the upper bezel. Alternatively, when the user makes the external electronic device 102 or 104 be in proximity to or in contact with the lower bezel of the housing 802, the electronic device 101 may make a request for an execution command of a second function to the external electronic device 102 or 104 in response to the electromagnetic signal transferred from the electromagnetic wave reception antenna 820 in the direction of the lower bezel.

The arrangement structure of the electromagnetic wave reception antennas is illustrated only for convenience of description, and the number, the arrangement location, and the size of electromagnetic wave reception antennas may be implemented in various forms of the electronic device.

Figure 9:
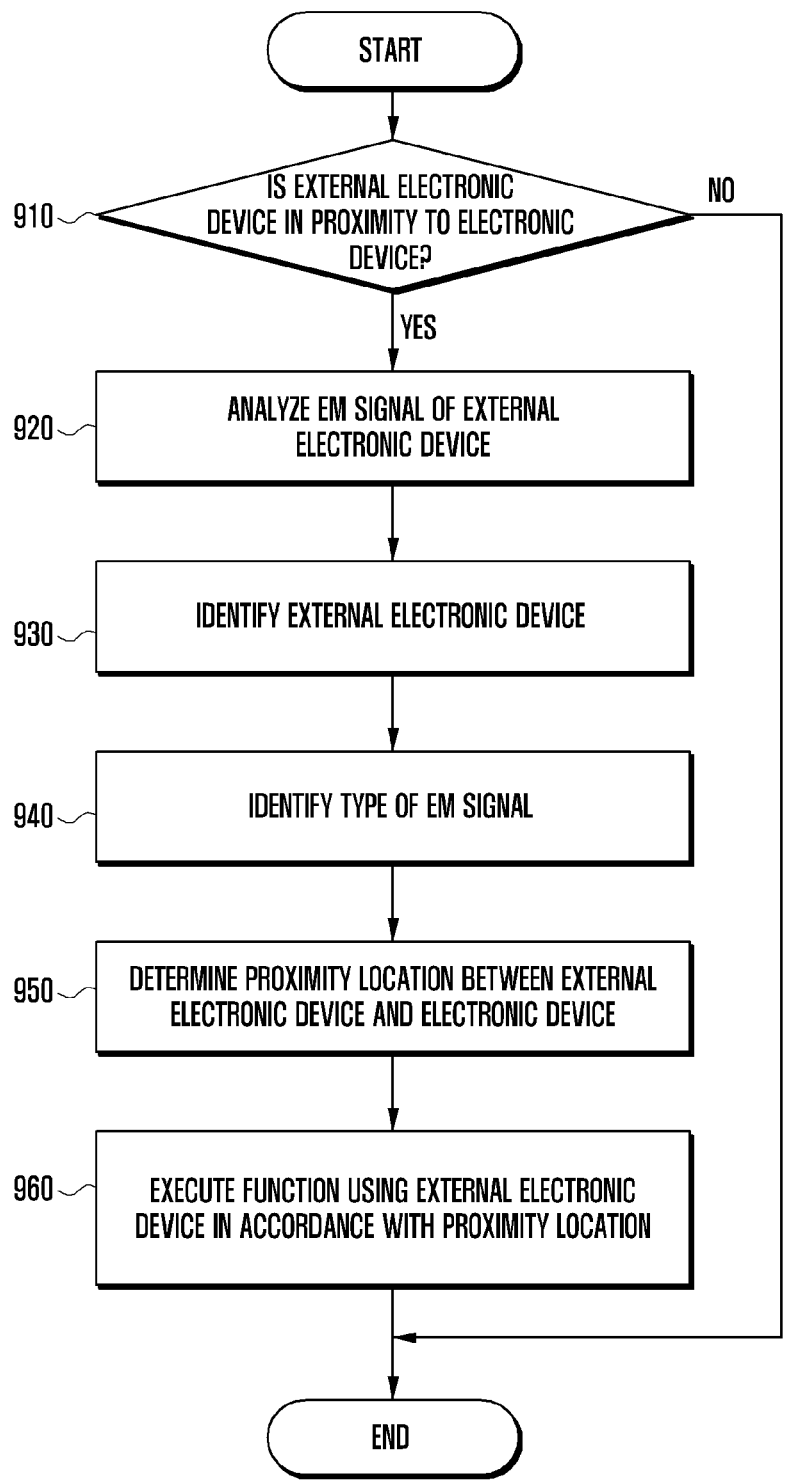
FIG. 9 illustrates a method of controlling functions of an external electronic device through an electronic device according to various embodiments.

FIG. 9 illustrates a method of controlling functions of an external electronic device through an electronic device according to various embodiments.

Referring to FIG. 9, the processor (for example, the processor 120 of FIGS. 1 and 2, the application processor 320 of FIG. 3, the application processor 420 of FIG. 4, the processor 520 of FIG. 5, or the processor 620 of FIG. 6) of the electromagnetic wave sensing electronic device (for example, the electronic device 101 of FIGS. 1 and 2) may determine whether the external electronic device (for example, the external electronic device 102 or 104 of FIGS. 1 and 2) are in proximity to (or in contact with) the electronic device in operation 910.

For example, when information indicating that an electromagnetic signal which satisfies a predetermined condition (for example, condition under which the electromagnetic signal has an intensity in a predetermined range or larger or has a frequency characteristic within a predetermined range) or the electromagnetic signal which satisfies the predetermined condition is received through the EM module (for example, the EM module 195 of FIG. 2, the EM module 395 of FIG. 3, or the EM module 495 of FIG. 4) or the communication module (for example, the communication module 190 of FIGS. 1 and 2 or the communication module 390 of FIG. 3), the processor 120, 320, 420, 520, or 620 may determine that the external electronic device 102 or 104 is in proximity to or in contact with the electronic device.

In operation 920, the processor 120, 320, 420, 520, or 620 may analyze the electromagnetic signal of the external electronic device 102 or 104 in response to the proximity of the external electronic device. The processor 120, 320, 420, 520, or 620 may determine whether a unique waveform characteristic of the electromagnetic signal is extracted. The processor 120, 320, 420, 520, or 620 may identify the type of the electromagnetic signal on the basis of the extracted waveform characteristic.

For example, external electronic devices (for example, TVs, notebooks, washing machines, and refrigerators) may propagate the electromagnetic signal having the unique waveform to the outside according to the product type. A developer may perform pre-sampling work for characteristic comparison and analysis of the electromagnetic signal. For example, the developer may repeatedly sense the electromagnetic waves generated from various types of electronic devices (for example, TVs, notebooks, washing machines, and refrigerators), standardize the electromagnetic signals according to the analyzed waveform characteristic (for example, categorize the electromagnetic signals on the bass of the characteristic after classification), and make in advance device mapping information (or a device loop up table) to which a device type-specific waveform characteristic is mapped. The electromagnetic signal for generating the device type-specific type mapping information may be also a sensing value after the electromagnetic signal is corrected through at least one of the first electromagnetic correction module 570 or 670 and the second electromagnetic correction module 580 or 680 of FIG. 5 or 6. The developer may store waveform characteristic information (or device type-specific mapping information) of the electromagnetic signal extracted through the sampling work in the electronic device 101 or a cloud server (for example, the server 108 of FIGS. 1 and 2).

In operation 930, the processor 120, 320, 420, 520, or 620 may identify the external electronic device 102 or 104 by identifying which electronic device corresponds to the extracted waveform characteristic of the electromagnetic signal on the basis of the device type-specific mapping information made in advance before the sampling work.

In operation 940, the processor 120, 320, 420, 520, or 620 may determine the proximity location (or contact location) between the electronic device 101 and the external electronic device 102 or 104 on the basis of the type of the electromagnetic signal. In connection with the identified external electronic device 102 or 104, the processor 120, 320, 420, 520, or 620 may determine the proximity location or the contact location between the external electronic device 102 or 104 and the electronic device 101 on the basis of location-specific mapping information which has passed through the sampling work to distinguish waveform characteristics according to the contact location between devices.

In addition, when sampling the electromagnetic signal, with respect to one electronic device, the developer may identify the contact location between devices, repeatedly sense the electromagnetic waves according to the identified location, and perform sampling work according to the contact location in every electronic device. The developer may extract a plurality of electromagnetic waveform characteristics corresponding to one device, and classify and standardize the extracted waveform characteristics (for example, categorize the waveform characteristics on the basis of characteristics of classification). The developer may make in advance location-specific mapping information (or a location look up table) in which location-specific waveform characteristic for identifying the contact location of the electromagnetic signal of each type of the electronic device is mapped. The developer may store location-specific electromagnetic waveform characteristic information (or location-specific mapping information) according to the type of the electronic device made through the sampling work in the electronic device 101 or the cloud server 108.

For example, a small electronic device having a small size standard, such as a table or a PC, may generate electromagnetic waves having one waveform characteristic regardless of the contact location, but a large electronic device having a large size standard, such as a TV, may generate electromagnetic waves having different waveform characteristics according to top and bottom or left and right locations. The number of pieces of electromagnetic waveform characteristic information corresponding to a table or a PC may be one, but electromagnetic waveform characteristic information corresponding to a TV device may be sensing values sensed at two or more locations, such as top and bottom locations.

According to an embodiment, the processor 120, 320, 420, 520, or 620 may identify where the waveform characteristic of the received electromagnetic waves is generated in the external electronic device on the basis of location-specific mapping information in the identified type of external electronic device.

In operation 950, the processor 120, 320, 420, 520, or 620 may identify one or more predetermined functions (or control functions) corresponding to the determined proximity location and execute one or more identified functions through at least part of the external electronic device. The one or more predetermined functions may be one or more of the function of the electronic device, the function of the external electronic device, and the connectivity function which can be performed through a link between the electronic device and the external electronic device.

According to an embodiment, the processor 120, 320, 420, 520, or 620 may identify an executed function and execute one or more predetermined functions according to waveform characteristic information of the electromagnetic signal in connection with the executed function.

According to an embodiment, the processor 120, 320, 420, 520, or 620 may identify the arrangement location of the electromagnetic wave reception antenna for detecting the electromagnetic signal and perform control to identify the one or more predetermined functions at least on the basis of the arrangement location of the reception antenna.

According to an embodiment, the processor 120, 320, 420, 520, or 620 may perform a predetermined first function through at least part of the connected external electronic device when the electromagnetic signal includes a first signal waveform characteristic, and perform a predetermined second function through at least part of the connected external electronic device when the electromagnetic signal includes a second signal waveform characteristic.

Figure 10:
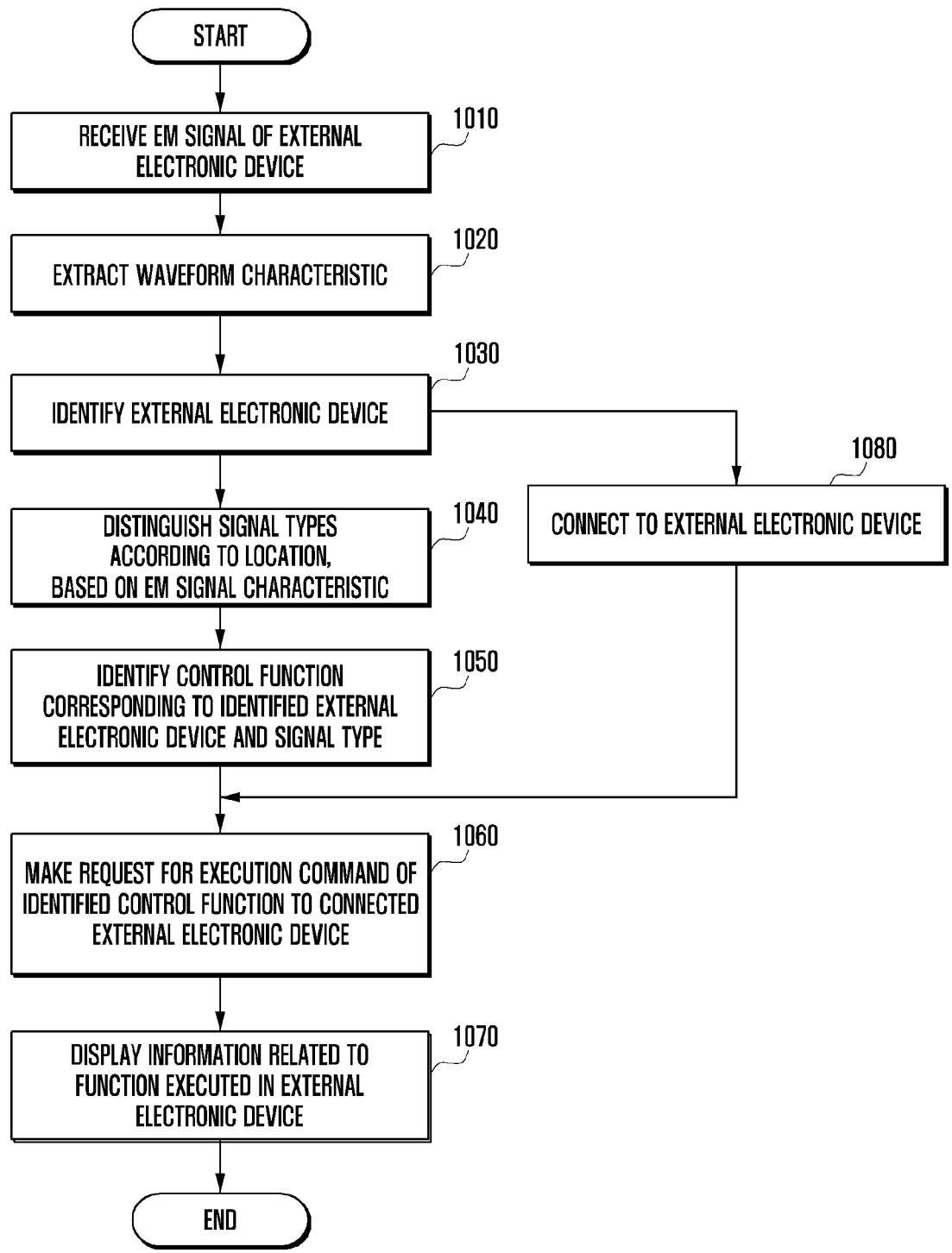
FIG. 10 illustrates a method of controlling functions of an external electronic device using an electronic device according to various embodiments.

FIG. 10 is a method of controlling functions of an external electronic device using an electronic device according to various embodiments.

Referring to FIG. 10, the processor (for example, the processor 120 of FIGS. 1 and 2, the application processor 320 of FIG. 3, or the processor 520 of FIG. 5) of the electromagnetic wave sensing electronic device (for example, the electronic device 101 of FIGS. 1 and 2) according to an embodiment may receive an electromagnetic (EM) signal generated by the external electronic device (for example, the external electronic device 102 or 104 of FIGS. 1 and 2) through the electromagnetic wave reception antenna in operation 1010. According to an embodiment, the electromagnetic signal may be an electromagnetic wave sensing value generated by correcting the electromagnetic signal through internal elements of the EM module of FIG. 5. The external electronic device 102 or 104 may be in a power-on state, and the electromagnetic intensity thereof may be different according to the device type or the contact location between devices.

According to an embodiment, the processor 120, 320, or 520 may receive the electromagnetic signal which satisfies a predetermined condition (for example, condition under which the electromagnetic signal has an intensity in a predetermined range or larger or has a frequency characteristic in a predetermined range) under the control of the EM module (for example, the EM module 195 of FIG. 2 or the EM module 395 of FIG. 3) or the communication module (for example, the communication module 190 of FIGS. 1 and 2, or the communication module 390 of FIG. 3).

In operation 1020, the processor 120, 320, or 520 may analyze the EM signal received from the external electronic device 102 or 104 and extract a unique waveform characteristic based on at least one the analysis result.

In operation 1030, the processor 120, 320, or 520 may compare the electromagnetic (EM) signal with analysis result device mapping information and identify which type is the external electronic device 102 or 104 in accordance with the received electromagnetic signal. For example, the processor 120, 320, or 520 may identify the external electronic device by identifying which electronic device corresponds to the extracted waveform characteristic of the electromagnetic signal on the basis of device mapping information made in advance through the sampling work.

In operation 1040, the processor 120, 320, or 520 may compare the waveform characteristic of the electromagnetic signal corresponding to the identified external electronic device with location-specific mapping information for classified according to the location and identify the waveform type according to the location. For example, respective electronic devices may have different waveform characteristics of electromagnetic waves generated according to the contact location between devices. In the case of notebook, waveform characteristics of electromagnetic waves generated on a lower part on which a keyboard is disposed and an upper part on which a display such as an LCD is disposed may be different from each other.

The processor 120, 320, or 520 may identify where the waveform characteristic of the received electromagnetic waves is generated in the identified external electronic device on the basis of the location-specific mapping information in the identified external electronic device type.

Meanwhile, in operation 1030, when the processor 120, 320, or 520 identifies the type of the external electronic device 102 or 104 on the basis of the waveform characteristic of the received electromagnetic waves, the processor 120, 320, or 520 may perform a communication connection with the external electronic device 102 or 104 in operation 1080. Operation 1080 and operations 1040 and 1050 are separately illustrated for convenience of description, but may be independently, sequentially, or concurrently performed. The processor 120, 320, or 520 may proceed to operation 1060 after completing the connection operation for the connectivity function with the external electronic device in operation 1080.

According to an embodiment, the processor 120, 320, or 520 may identify the connection function for communication according to the type of the identified external electronic device 102 or 104 and make a request for the connection to the external electronic device 102 or 104 by controlling the communication module 195 or 395. The processor 120, 320, or 520 may receive a response signal from the external electronic device 102 or 104 and complete the communication connection with the identified external electronic device 102 or 104 by controlling the communication module 190 or 390. For the communication connection with the external electronic device 102 or 104, short-range communication technology such as Bluetooth, Wi-Fi, and NFC may be used but is not limited thereto.

In operation 1050, the processor 120, 320, or 520 may identify a control function using at least some of the external electronic device in accordance with the waveform type of the electromagnetic signal of the identified external electronic device 102 or 104.

In operation 1060, the processor 120, 320, or 520 may make a request for an execution command of the identified control function to the connected external electronic device 102 or 104 on the basis of the proximity location or contact location between devices according to the waveform characteristic. The control function may be a connectivity function which can be performed through a link between the electronic device 101 and the external electronic device 102 or 104 but is not limited to and may be a function of the electronic device 101 using at least part of the external electronic device 102 or 104 or a function to be executed by the external electronic device 102 or 104. For example, the control function for the connectivity function may be executed by the external electronic device alone, the electronic device alone, or through a link between the external electronic device and the electronic device and may be configured to operate in various forms according to the electromagnetic type, but is not limited to.

In operation 1070, the processor 120, 320, or 520 may display information related to the control function executed by the external electronic device 102 or 104 on the display (for example, the display device 160 of FIG. 1). According to an embodiment, the processor 120, 320, or 520 may display control function information or execution command notification information on the screen when a request for executing the control function is transmitted to the external electronic device 102 or 104. Meanwhile, operation 1070 may be omitted but is not limited thereto.

Figure 11:
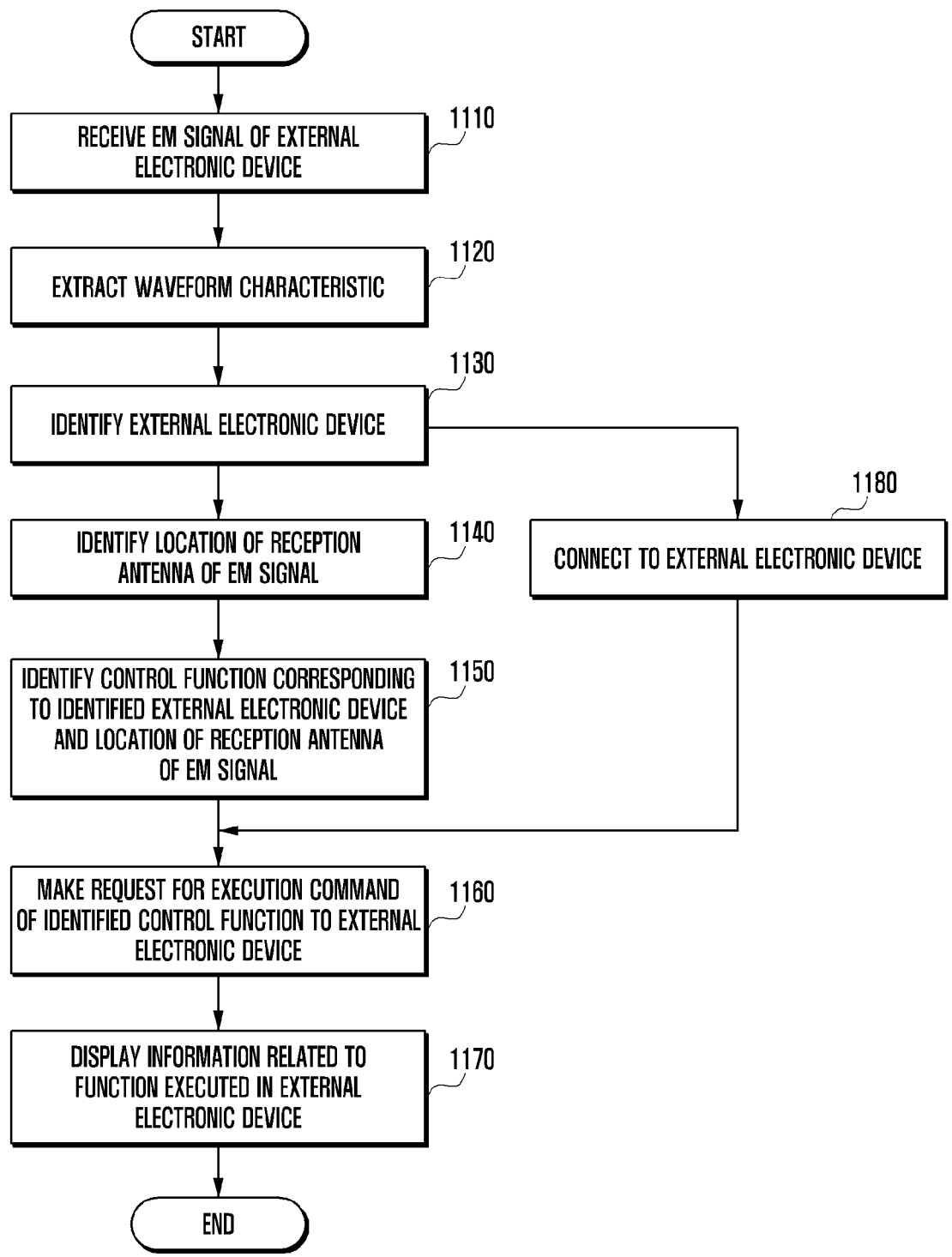
FIG. 11 illustrates a method of controlling functions of an external electronic device using an electronic device according to various embodiments.

FIG. 11 is a method of controlling functions of an external electronic device using an electronic device according to various embodiments.

Referring to FIG. 11, the processor (for example, the processor 120 of FIGS. 1 and 2, the application processor 420 of FIG. 4, or the processor 620 of FIG. 6) of the electromagnetic wave sensing electronic device (for example, the electronic device 101 of FIGS. 1 and 2) may receive the electromagnetic (EM) signal generated by the external electronic device (for example, the external electronic device 102 or 104 of FIGS. 1 and 2) through the electromagnetic wave reception antenna in operation 1110. According to an embodiment, the electromagnetic signal may be an electromagnetic wave sensing value generated by correcting the electromagnetic signal through internal elements of the EM module of FIG. 6. The external electronic device 102 or 104 may be in a power-on state, and electromagnetic intensities thereof may be different according to the device type or the contact location between devices.

According to an embodiment, the processor 120, 420, or 620 may receive the electromagnetic signal which satisfies a predetermined condition (for example, condition by which the electromagnetic signal has an intensity in a predetermined range or larger or has a frequency characteristic in a predetermined range) under the control of the EM module (for example, the EM module 195 of FIG. 2 or the EM module 495 of FIG. 4) or the communication module (for example, the communication module 190 of FIGS. 1 and 2).

In operation 1120, the processor 120, 420, or 620 may extract the waveform characteristic by analyzing the electromagnetic (EM) signal received from the external electronic device 102 or 104.

In operation 1130, the processor 120, 420, or 620 may identify which type is the external electronic device 102 or 104 corresponding to the received electromagnetic signal by comparing the electromagnetic (EM) signal with analysis result device mapping information. For example, the processor 120, 420, or 620 may identify the external electronic device 102 or 104 by checking which electronic device corresponding to the extracted waveform characteristic of the electromagnetic signal on the basis of the device mapping information made in advance through the sampling work.

Meanwhile, when identifying which type is the external electronic device 102 or 104 on the basis of the waveform characteristic of the received electromagnetic waves, the processor 120, 420, or 620 may perform the communication connection with the external electronic device 102 or 104 for the connectivity function in operation 1180. Operation 1180 may be performed independently from, sequentially with, or concurrently with operations 1140 and 1150, but is not limited thereto. The processor 120, 420, or 620 may proceed to operation 1160 after completing the connection operation for the connectivity function with the external electronic device 102 or 104 in operation 1180.

According to an embodiment, the processor 120, 420, or 620 may identify the connection function for communication according to the type of the identified external electronic device 102 or 104, make a request for the connection to the external electronic device 102 or 104, receive a response signal from the external electronic device, and complete the communication connection with the identified external electronic device 102 or 104.

In operation 1140, the processor 120, 420, or 620 may identify the location of a reception antenna for receiving the electromagnetic signal. For example, when the electronic device includes a plurality of electromagnetic wave reception antennas, the processor 120, 420, or 620 may identify the antenna through which the electromagnetic waveform characteristic is extracted from the detected electromagnetic signal. The processor 120, 420, or 620 may receive the electromagnetic signal from the plurality of electromagnetic wave reception antennas, but may identify the antenna having the largest reception intensity of the electromagnetic signal and identify the location at which the reception antenna is arranged.

For example, when the electromagnetic wave reception antennas are arranged on the upper part and the lower part of the electronic device 101, the user may make the electronic device 101 be in proximity to or in contact with the external electronic device 102 or 104 through the upper bezel part. Then, the processor 120, 420, or 620 may identify that the intensity of the electromagnetic signal transferred from the reception antenna arranged on the upper part is the largest and identify that the reception antenna receiving the electromagnetic signal is arranged on the upper part. Operation 1140 is illustrated to be sequentially performed after operations 1120 and 1130 for convenience of description, but is not limited thereto and may be performed before operation 1120 or 1130.

In operation 1150, the processor 120, 420, or 620 may identify the control function of the external electronic device 102 or 104 designated to correspond to the arrangement location of the reception antenna.

The electronic device 101 may configure antenna location-specific function mapping information for the connectivity function between devices according to the arrangement location of the reception antenna. The antenna location-specific function mapping information may be changed according to the number of reception antennas arranged within the electronic device. For example, when the electronic device 101 includes one reception antenna, one control function may be configured. When the electronic device 101 includes two reception antennas, two control functions corresponding to respective reception antenna locations may be configured. The antenna location-specific function mapping information may be set when manufactured or by the user.

In operation 1160, the processor 120, 420, or 620 may make a request for an execution command of the identified control function to the connected external electronic device 102 or 104 in accordance with the location of the reception antenna. The control function may be a connectivity function which can be performed through a link between the electronic device 101 and the external electronic device 102 or 104 but is not limited to and may be a function of the electronic device 101 using at least part of the external electronic device 102 or 104 or a function to be executed by the external electronic device 102 or 104.

For example, when the upper part of the electronic device is in proximity to or in contact with a TV device, the processor 120, 420, or 620 may make a request for a first control function (for example, a channel change) mapped in accordance with the upper reception antenna. Alternatively, when the lower part of the electronic device is in proximity to or in contact with a TV device, the processor 120, 420, or 620 may make a request for a second control function (for example, menu output) mapped in accordance with the lower reception antenna.

In operation 1170, the processor 120, 420, or 620 may display information related to the control function executed by the external electronic device 102 or 104 on the display (for example, the display device 160 of FIG. 1). According to an embodiment, the processor 120, 420, or 620 may display control function information or execution command notification information on the screen when a request for executing the control function is transmitted to the external electronic device 102 or 104. Meanwhile, operation 1170 may be omitted but is not limited thereto.

Figure 12:
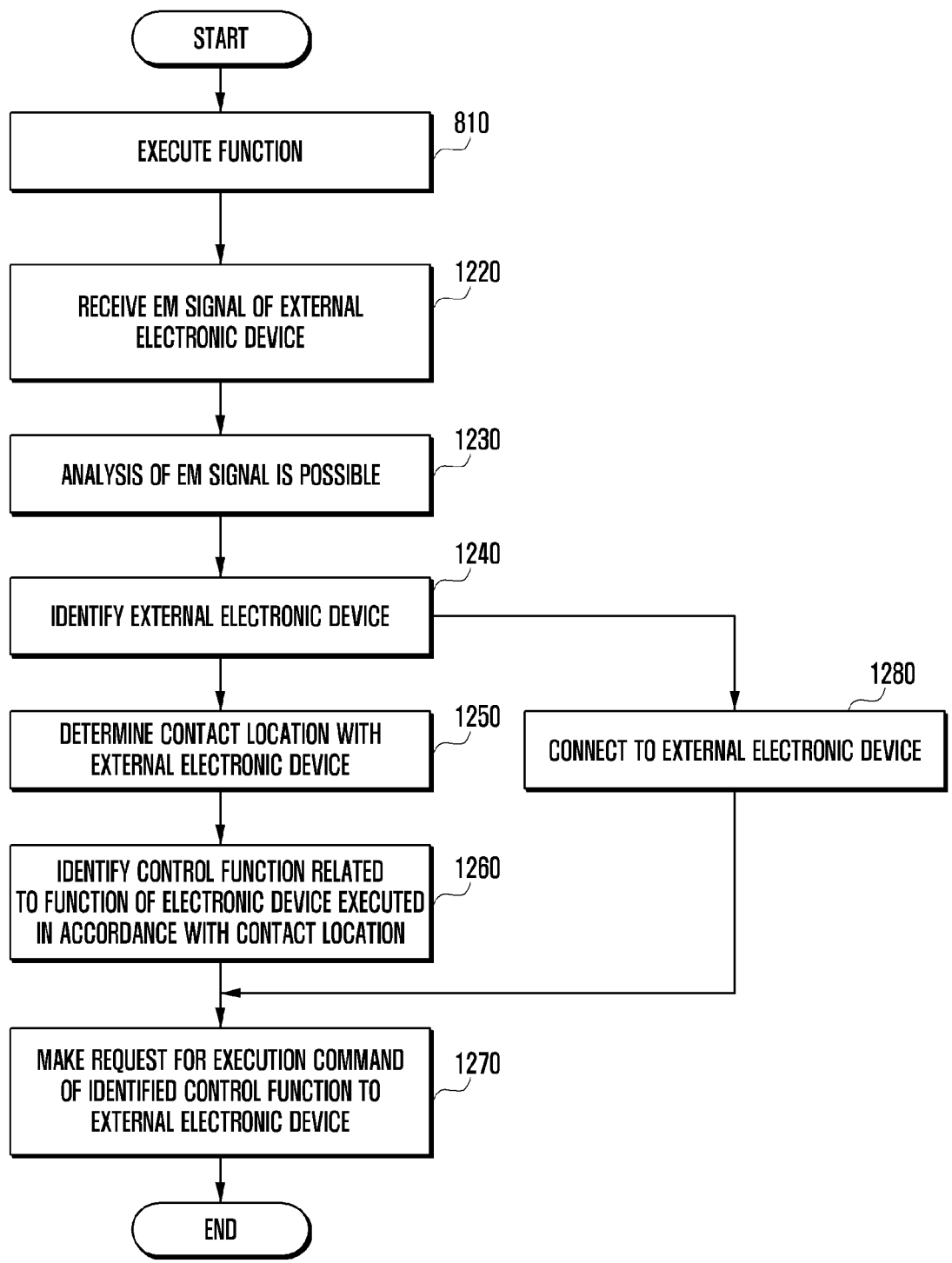
FIG. 12 illustrates a method of controlling functions of an external electronic device through an electronic device according to various embodiments.

FIG. 12 illustrates a method of controlling functions of an external electronic device through an electronic device according to various embodiments.

Referring to FIG. 12, the processor (for example, the processor 120 of FIGS. 1 and 2, the application processor 320 of FIG. 3, the application processor 420 of FIG. 4, the processor 520 of FIG. 5, or the processor 620 of FIG. 6) of the electromagnetic wave sensing electronic device (for example, the electronic device 101 of FIGS. 1 and 2) may execute the functions of the electronic device 101 according to a user's request in operation 1210. For example, the electronic device 101 may be in a state in which a video reproduction function is executed or an image album is displayed in response to a user input under the control of the processor 120, 320, 420, 520, or 620.

In operation 1220, the processor 120, 320, 420, 520, or 620 may receive the electromagnetic (EM) signal generated by the external electronic device through the electromagnetic wave reception antenna. The electromagnetic signal may be an electromagnetic wave sensing value generated by correcting the electromagnetic signal through internal elements of the EM module of FIGS. 5 and 6. For example, the processor 120, 320, 420, 520, or 620 may receive the electromagnetic signal which satisfies a predetermined condition (for example, condition under which the electromagnetic signal has an intensity in a predetermined range or larger or has a frequency characteristic within a predetermined range through the EM module (for example, the EM module 195 of FIG. 2, the EM module 395 of FIG. 3, or the EM module 495 of FIG. 4) or the communication module (for example, the communication module 190 of FIGS. 1 and 2 or the communication module 390 of FIG. 3).

In operation 1230, the processor 120, 320, 420, 520, or 620 may extract the unique waveform characteristic of the electromagnetic signal by analyzing the electromagnetic (EM) signal transferred from the antenna.

In operation 1240, the processor 120, 320, 420, 520, or 620 may identify which type is the external electronic device 102 or 104 in accordance with the electromagnetic signal received from the external electronic device 102 or 104 through comparison with device mapping information. For example, the processor 120, 320, 420, 520, or 620 may identify the external electronic device 102 or 104 by checking which electronic device corresponding to the extracted waveform characteristic of the electromagnetic signal on the basis of the device mapping information made in advance through the sampling work.

Meanwhile, when identifying the type of the external electronic device 102 or 104 on the basis of the waveform characteristic of the received electromagnetic waves, the processor 120, 320, 420, 520, or 620 may perform the communication connection with the external electronic device for the connectivity function in operation 1280. Operation 1280 may be performed independently from, sequentially with, or concurrently with operations 1250 and 1260, but is not limited thereto.

In operation 1250, the processor 120, 320, 420, 520, or 620 may determine the contact location (or proximity location) between the electronic device 101 and the external electronic device 102 or 104. The processor 120, 320, 420, 520, or 620 may determine the contact location (or proximity location) between devices on the basis of at least one of the waveform characteristic of electromagnetic waves and arrangement location information of the reception antenna.

According to an embodiment, the processor 120, 320, 420, 520, or 620 may identify the contact location between devices on the basis of location-specific waveform characteristic information (or location-specific mapping information) for classifying waveform characteristics of the electromagnetic signals corresponding to the identified external electronic device 102 or 104 according to the location through the advance sampling work. For example, the unique electromagnetic signal may be generated in a predetermined range at the location of at least one of the external electronic devices 102 and 104. The processor 120, 320, 420, 520, or 620 may identify the contact (tag) or proximity location between the electronic device 101 and the external electronic device 102 or 104 by comparing the unique electromagnetic signal generated by the external electronic device 102 or 104 with information stored in the electronic device (for example, device mapping information in which type-specific waveform characteristic is mapped or location-specific mapping information).

According to another embodiment, the processor 120, 320, 420, 520, or 620 may identify the proximity or contact location between the external electronic device 102 or 104 and the electronic device 101 by identify the arrangement location of the reception antenna for receiving the electromagnetic signal.

In operation 1260, the processor 120, 320, 420, 520, or 620 may identify the control function related to the function of the electronic device executed for the connectivity function in accordance with the contact location with the connected external electronic device 102 or 104. The control function, for example, the control function for the connectivity function may be executed by the external electronic device alone, the electronic device alone, or through a link between the external electronic device and the electronic device and may be set to operate in various forms according to the electromagnetic type on the basis of the executed function, but is not limited thereto.

In operation 1270, the processor 120, 320, 420, 520, or 620 may make a request for an execution command of the identified control function to the external electronic device 102 or 104.

For example, when a video production function is executed, the processor 120, 320, 420, 520, or 620 may make a request for a video reproduction command to the external electronic device 102 or 104 by transmitting video information and the execution command to control the connectivity function with the external electronic device 102 or 104. The external electronic device 102 or 104 connected to the electronic device 101 through communication may reproduce the video in response to the video reproduction command from the electronic device 101. The user may make a request for executing the connectivity function to the external electronic device by making the electronic device 101 be in proximity to or in contact with the external electronic device 102 or 104 at a particular location.

Although not illustrated, when the request for reproducing the video is made by the external electronic device, the processor 120, 320, 420, 520, or 620 may further perform an operation of stopping the video reproduction function being executed by the electronic device 101 or displaying notification information of the execution command, but is not limited thereto.

Figure 13:
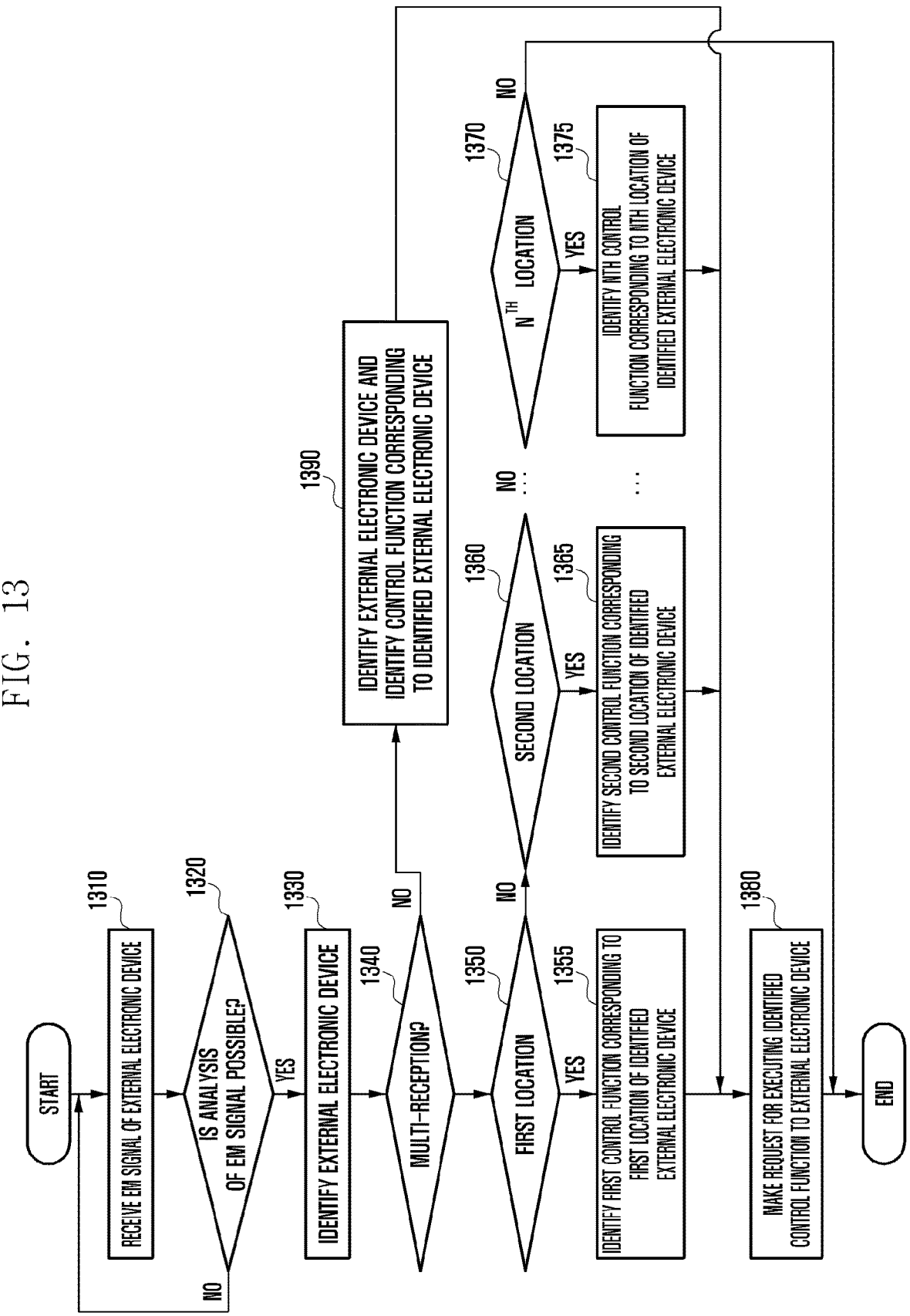
FIG. 13 is a flowchart illustrating the operation of an external electronic device using an electronic device according to various embodiments.

FIG. 13 is a flowchart illustrating the operation of an external electronic device using an electronic device according to various embodiments.

Referring to FIG. 13, the processor (for example, the processor 120 of FIGS. 1 and 2, the application processor 320 of FIG. 3, the application processor 420 of FIG. 4, the processor 520 of FIG. 5, or the processor 620 of FIG. 6) of the electromagnetic wave sensing electronic device (for example, the electronic device 101 of FIGS. 1 and 2) according to an embodiment may receive the electromagnetic (EM) signal generated by the external electronic device 102 or 104 through the electromagnetic wave reception antenna in operation 1310. The electromagnetic signal may be an electromagnetic wave sensing value generated by correcting the electromagnetic signal through internal elements of the EM module of FIGS. 5 and 6.

In operation 1320, the processor 120, 320, 420, 520, or 620 may determine whether the waveform characteristic is extracted by analyzing the electromagnetic (EM) signal transferred from the antenna. Meanwhile, when the received electromagnetic signal has a level intensity in a predetermined range or smaller in which analysis of the signal is not easy in operation 1320, the processor 120, 320, 420, 520, or 620 may determine that the waveform characteristic cannot be extracted and return to operation 1310 and wait for receiving the electromagnetic waves.

In operation 1330, the processor 120, 320, 420, 520, or 620 may identify the external electronic device 102 or 104 in accordance with the waveform characteristic of the electromagnetic signal received from the external electronic device 102 or 104 through comparison with device mapping information. For example, the processor 120, 320, 420, 520, or 620 may identify the external electronic device 102 or 104 by checking which electronic device corresponding to the extracted waveform characteristic of the electromagnetic signal on the basis of the device mapping information made in advance through the sampling work.

Meanwhile, although not illustrated, when identifying the type of the external electronic device 102 or 104 on the basis of the waveform characteristic of the received electromagnetic waves, the processor 120, 320, 420, 520, or 620 may perform the communication connection with the external electronic device 102 or 104 for the connectivity function. The connection operation with the external electronic device 102 or 104 may be performed independently from operations 1340 to 1375, but is not limited thereto.

In operation 1340, the processor 120, 320, 420, 520, or 620 may determine whether multi-reception of electromagnetic signals is possible. For example, when the number of electromagnetic wave reception antennas arranged in the electronic device 101 is plural, the processor 120, 320, 420, 520, or 620 may determine that the multi-reception is possible. When the external electronic device 102 or 104 is large or corresponds to a large device type having a standard in which a control panel is distributed on the basis of information on the identified external electronic device 102 or 104, the processor 120, 320, 420, 520, or 620 may determine that the multi-reception is possible.

In operation 1350, the processor 120, 320, 420, 520, or 620 may determine whether the contact (or proximity) between the electronic device 101 and the external electronic device 102 or 104 is generated at a first location on the basis of the received electromagnetic signal, and when the contact between the devices is generated at the first location, proceed to operation 1355 and identify a predetermined first control function in accordance with the first location for the connectivity function with the external electronic device 102 or 104.

When the contact between the devices is generated, the processor 120, 320, 420, 520, or 620 may proceed to operation 1360 and determine whether the contact between the devices is generated at the second location when the electromagnetic signal is not received at the first location. When the electromagnetic signal is generated at the second location, the processor 120, 320, 420, 520, or 620 may proceed to operation 1365 and identify a predetermined second control function in accordance with the second location for the connectivity function with the external electronic device 102 or 104.

When the contact between the devices is generated, if the electromagnetic signal is not received at the second location, the processor 120, 320, 420, 520, or 620 may identify whether the contact between the devices is generated at a third location, for example, an $N^{th}$ location I operation 1370 and identify a predetermined Nth function in accordance with the $N^{th}$ location for the connectivity function with the external electronic device 102 or 104 in operation 1375.

In operation 1380, the processor 120, 320, 420, 520, or 620 may make a request for an execution command of the identified control function to the external electronic device 102 or 104 in accordance with the electromagnetic waveform type. After performing the connection operation for the connectivity function with the external electronic device 102 or 104, the processor 120, 320, 420, 520, or 620 may transfer control function information and execution information to the external electronic device 102 or 104 and make a request for executing the identified control function to the external electronic device 102 or 104 in operation 960.

When the multi-reception of the electromagnetic signals is not possible in operation 1340, the processor 120, 320, 420, 520, or 620 may identify the external electronic device 102 or 104 on the basis of the electromagnetic waveform characteristic and identify the control function corresponding to the identified external electronic device in operation

1390. The processor 120, 320, 420, 520, or 620 may make a request for the execution command of the identified control function to the external electronic device 102 or 104 in operation 1380.

Meanwhile, although not illustrated, the processor 120, 320, 420, 520, or 620 may display control function information or notification information of the execution command on the screen when the request for executing the control function transmitted to the external electronic device 102 or 104 is made or may omit the same.

Figure 14A:
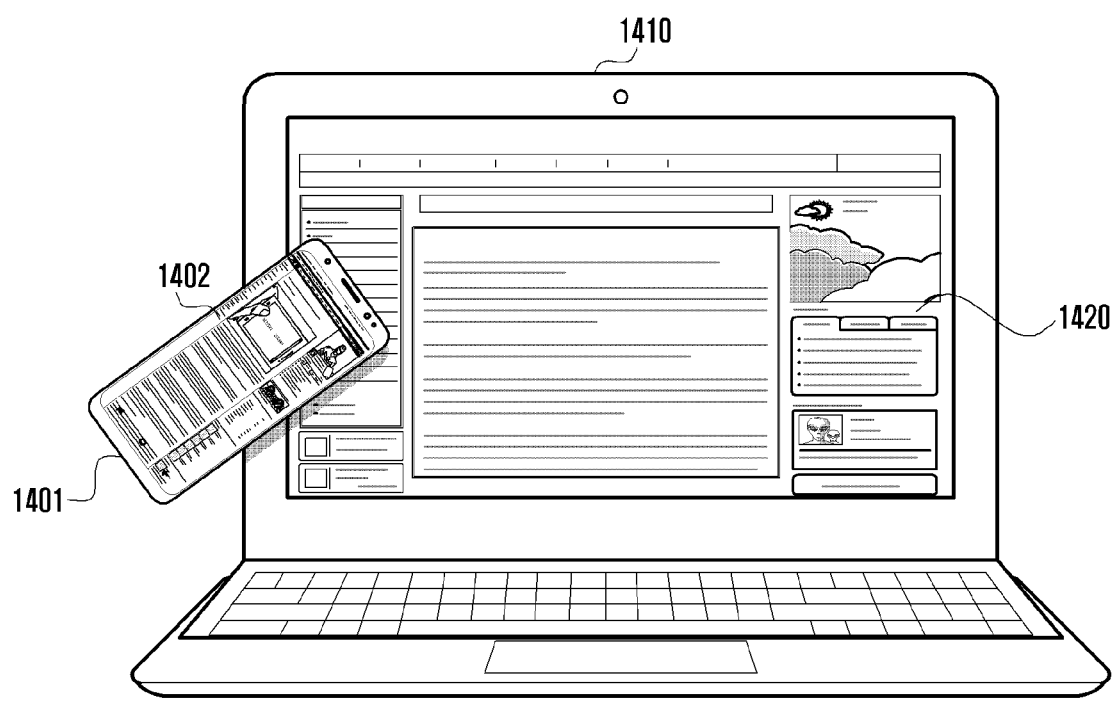
FIGS. 14A and 14B illustrate a situation of an external electronic device using an electronic device according to various embodiments.
Figure 14B:
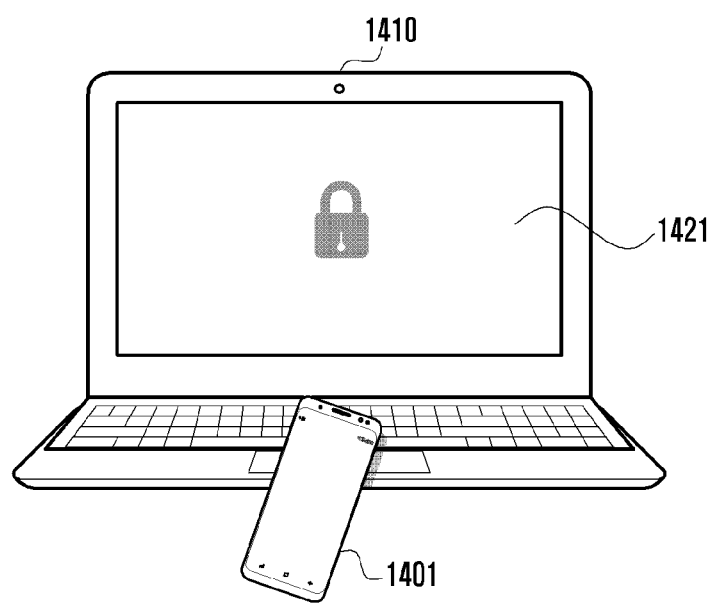
Figure 15A:
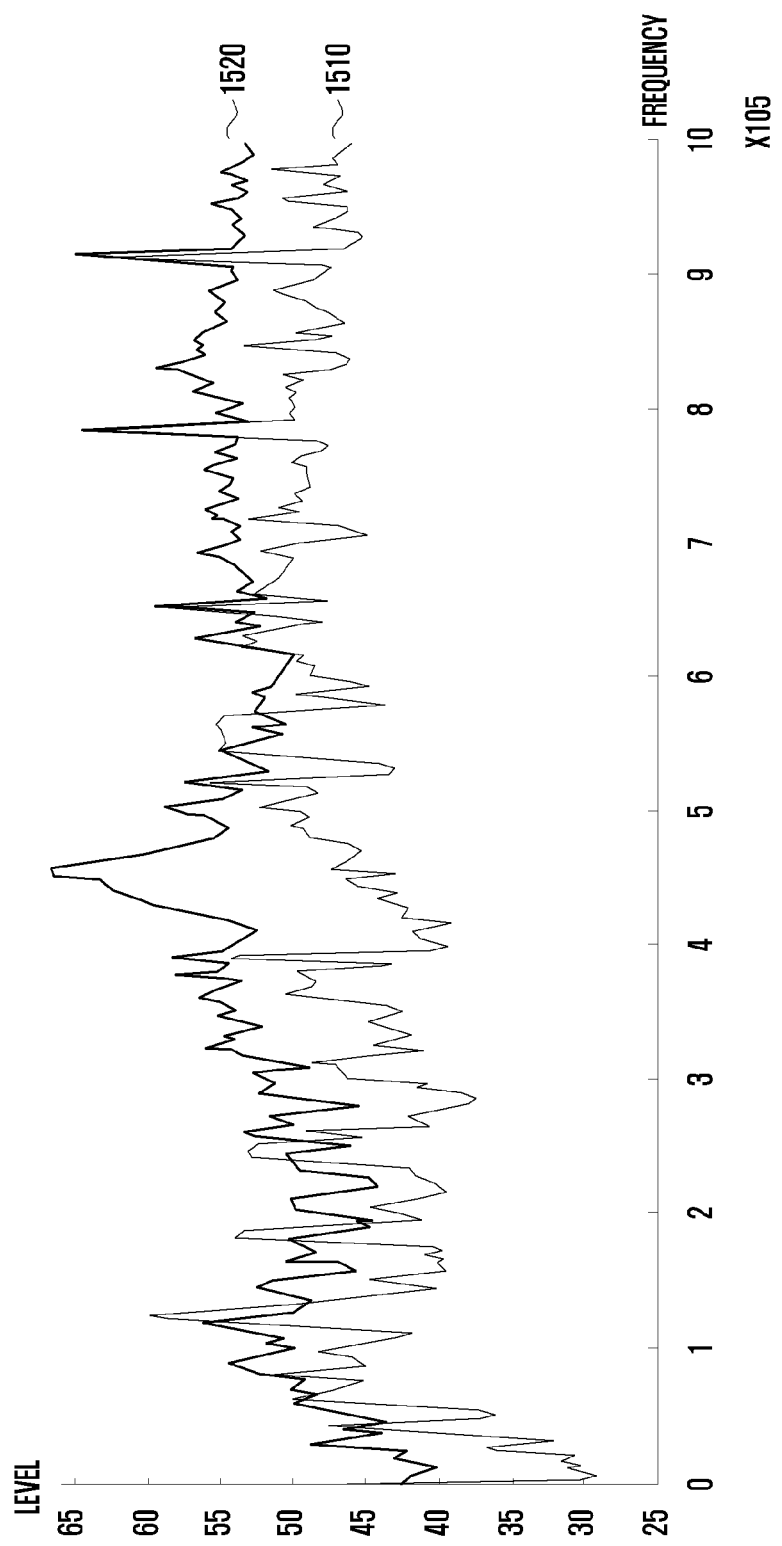
FIGS. 15A and 15B illustrate a visualized electromagnetic waveform characteristic of the electronic device.
Figure 15B:
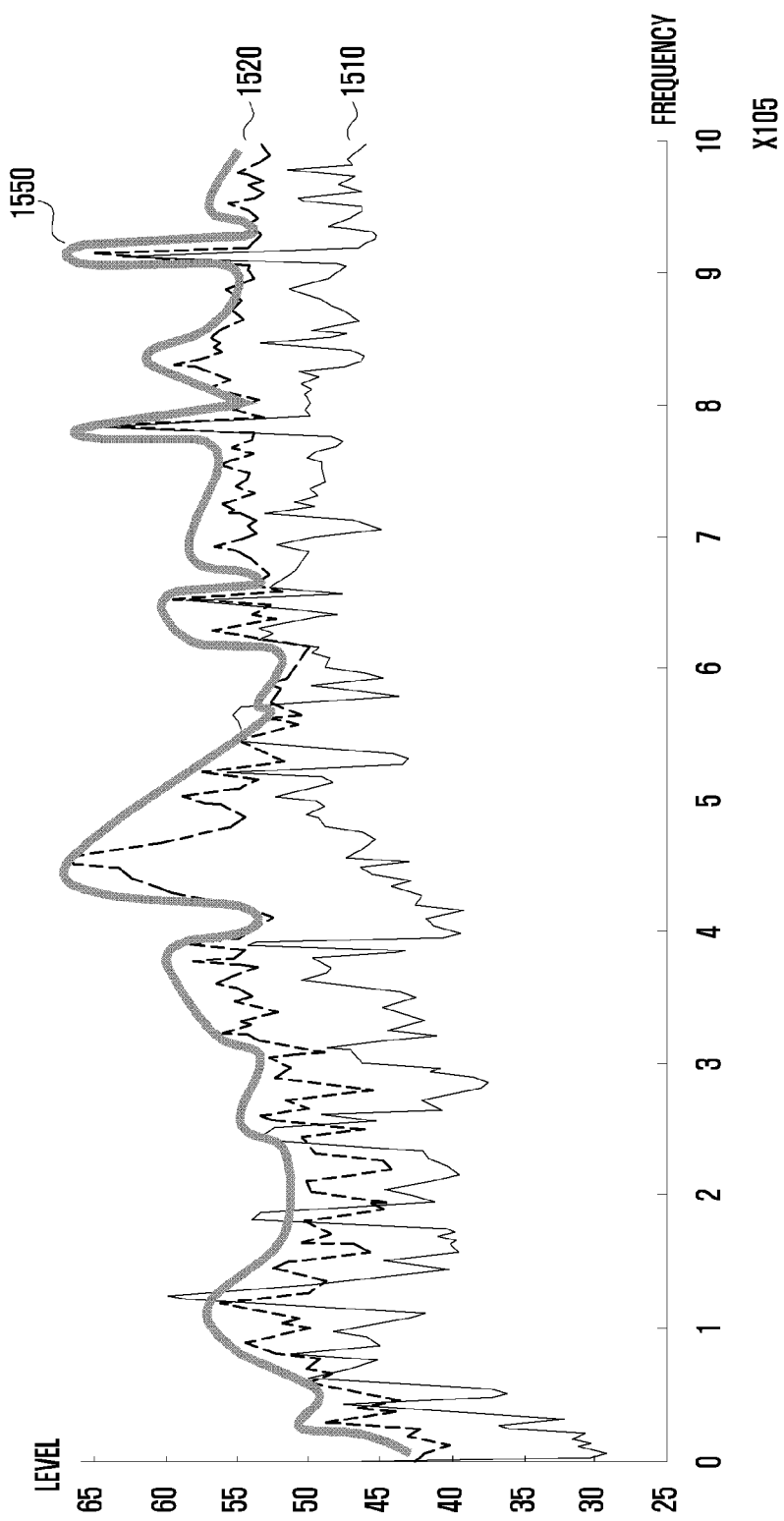

FIGS. 14A and 14B illustrate a situation of an external electronic device using an electronic device according to various embodiments, and FIGS. 15A and 15B illustrate a visualized electromagnetic waveform characteristic of the electronic device.

Referring to FIGS. 14A and 14B, an electromagnetic wave sensing electronic device 1401 (for example, the electronic device 101 of FIGS. 1 and 2) may be in proximity to or tagged on an external electronic device 1410 (for example, the external electronic device 102 or 104 of FIGS. 1 and 2) by the user. The electromagnetic wave sensing electronic device 1401 may make a request for a control command for connectivity functions which are different according to the proximity or tag location of the external electronic device 1410 to the external electronic device 1410 on the basis of the electromagnetic signal. For example, in the case of a laptop computer (the external electronic device 1410), an electromagnetic waveform characteristic generated by the display side and an electromagnetic waveform characteristic generated by the keyboard or touch pad side may be different from each other. The electromagnetic wave sensing electronic device 1401 or the server according to an embodiment may perform sampling work in advance and store waveform characteristic information of various electronic devices. For example, reference numeral 1510 of FIG. 15A indicates a waveform characteristic of the electromagnetic signal generated by a display (LCD panel) of a particular laptop computer during the sampling work. Reference numeral 1520 of FIG. 15A indicates a waveform characteristic of the electromagnetic signal generated by the keyboard or touch pad side of the particular laptop computer during the sampling work.

As illustrated in FIG. 14A, the user may bring the electromagnetic wave sensing electronic device 1401 into contact with the upper part of the laptop computer 1410, that is, the display side. The electromagnetic wave sensing electronic device 1401 may detect an electromagnetic signal generated on the display side and analyze the waveform characteristic of the electromagnetic waves, so as to identify the contact location (or the electromagnetic signal reception location) on the display side. For example, the electromagnetic wave sensing electronic device 1401 may correct the electromagnetic signal through the EM module of FIGS. 5 and 6 and calculate an electromagnetic wave sensing value of the envelope waveform characteristic as indicated by reference numeral 1550 of FIG. 15B.

The electromagnetic wave sensing electronic device or the server may identify the reception of the electromagnetic signal generated on the display side of the laptop computer by comparing waveform characteristic information of the electromagnetic signal stored by the sampling work with the waveform characteristic of the currently received electromagnetic signal.

According to an embodiment, the electromagnetic wave sensing electronic device 1401 may transfer the electromagnetic wave sensing value received through the EM module to the server and receive the analysis result of the electromagnetic wave sensing value from the server, so as to identify the reception of the electromagnetic signal generated on the display side of the laptop computer.

The electromagnetic wave sensing electronic device 1401 may make a request for an execution command of a first control function set in accordance with the display location (for example, a first location) of the laptop computer 1410 to the laptop computer.

For example, the electromagnetic wave sensing electronic device 1401 may be in a state in which a particular website is displayed on a display 1402 since a web browser is executed by a user's request. When the electromagnetic wave sensing electronic device 1401 is in contact with the display of the laptop computer 1410 in the state in which the particular website is displayed, the electromagnetic wave sensing electronic device 1401 may transfer (mirror) screen information displayed on the screen to the external electronic device 1410 or transfer address information of the particular website and a web browser execution command. The laptop computer 1410 may access the particular website displayed on the electromagnetic wave sensing electronic device 1401 in response to the execution command of the electromagnetic wave sensing electronic device 1401 and output a website screen 1420 on the display of the laptop computer.

Meanwhile, as illustrated in FIG. 14B, when the user brings the electromagnetic wave sensing electronic device 1401 into contact with the lower part of the laptop computer 1410, that is, the keyboard or the touch pad, the electromagnetic wave sensing electronic device 1401 may detect the electromagnetic waves generated by the touch pad and analyze the waveform characteristic of the electromagnetic waves, so as to identify the contact location on the pad. The electromagnetic wave sensing electronic device 1401 may make a request for an execution command of a second function corresponding to the location on the touch pad (for example, a second location) of the laptop computer 1410 to the laptop computer 1410. For example, when the electromagnetic wave sensing electronic device 1401 is in contact with the touch pad of the laptop computer 1410, the electromagnetic wave sensing electronic device 1401 may make a request for a lock/unlock command of the laptop computer 1410. When the laptop computer 1410 is in the lock state, the laptop computer 1410 may be changed to the unlock state by the contact with the electromagnetic wave sensing electronic device 1401. When the laptop computer 1410 is in the unlock state, the laptop computer 1410 may be changed to the lock state 1421 by the contact with the electromagnetic wave sensing electronic device 1401.

As described above, the user may transfer the control command for the connectivity function to the external electronic device through the electromagnetic wave sensing electronic device on the basis of the contact or proximity operation once. Accordingly, the user may control the execution of the function through the operation only once without a series of operations such as a request for the connection with the external electronic device, a request for entering the connectivity function, and a request for executing the function.

Figure 16A:
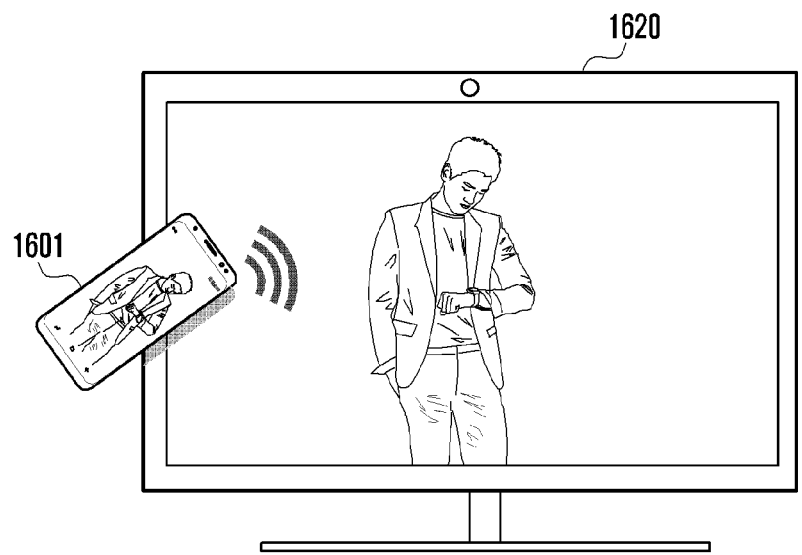
FIGS. 16A and 16B illustrate a visualized electromagnetic waveform characteristic of an electronic device according to an embodiment.
Figure 16B:
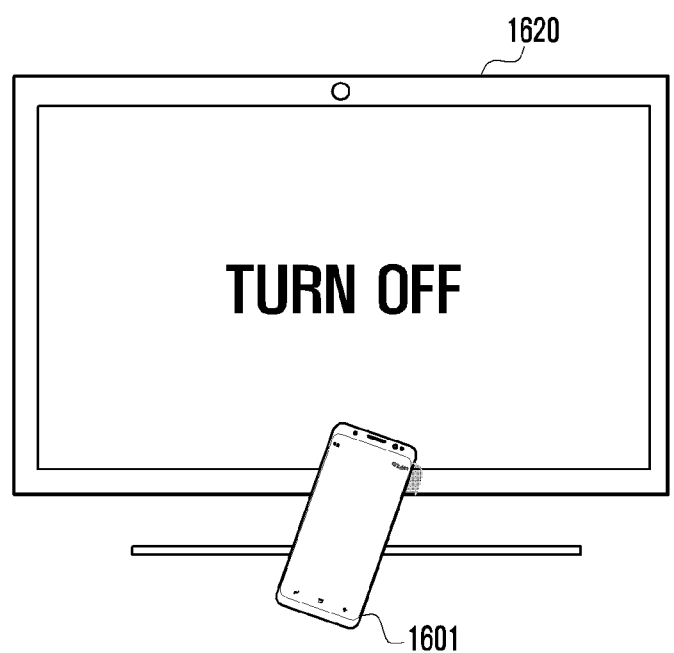

FIGS. 16A and 16B illustrate a visualized electromagnetic waveform characteristic of an electronic device according to an embodiment.

Referring to FIGS. 16A and 16B, according to an embodiment, an electromagnetic wave sensing electronic device 1601 may be in proximity to or in contact with a TV device

1620 at a first location under the control of the user in order to control execution of the connectivity function with the TV device 1620.

The electromagnetic wave sensing electronic device 1601 may detect the electromagnetic signal generated by the TV device 1620 and analyze the electromagnetic signal, so as to identify that the electromagnetic signal is an electromagnetic signal generated at a first location of the TV device 1620. The electromagnetic wave sensing electronic device 1601 may perform the communication connection with the identified TV device 1620 and transfer a control command to the TV device 1620 to display a screen or a photo currently shown on the screen or a reproduced video in the TV device 1620 in response to the electromagnetic signal at the first location. Then, the TV device 1620 may reproduce the screen or the photo shown on the electronic device 1601 or the reproduced video through the display of the TV device 1620 according to the control command of the electromagnetic wave sensing electronic device 1601.

However, when the electromagnetic wave sensing electronic device 1601 is in contact with or in proximity to the TV device 1620 at the second location under the control of the user, the electromagnetic wave sensing electronic device 1601 may analyze the electromagnetic signal generated by the TV device 1620 and identify that the generated electromagnetic signal is the electromagnetic signal generated at the second location of the TV device 1620. The electromagnetic wave sensing electronic device 1601 may transfer the control command to the TV device 1620 to display a remote control function of the TV device 1620 or turn off the TV device 1620 in response to the electromagnetic signal at the second location. The TV device 1620 may perform the remote control function of the TV device 1620 or turn off the TV device 1620 by the control command of the electronic device 1601.

According to an embodiment, the connectivity function may be set by user's settings or during manufacturing. The electromagnetic wave sensing electronic device may be implemented to provide a setting menu for setting the connectivity function according to the location to the screen and to set the connectivity function according to the location on the basis of the type of the electronic device through the setting menu.

Figure 17:
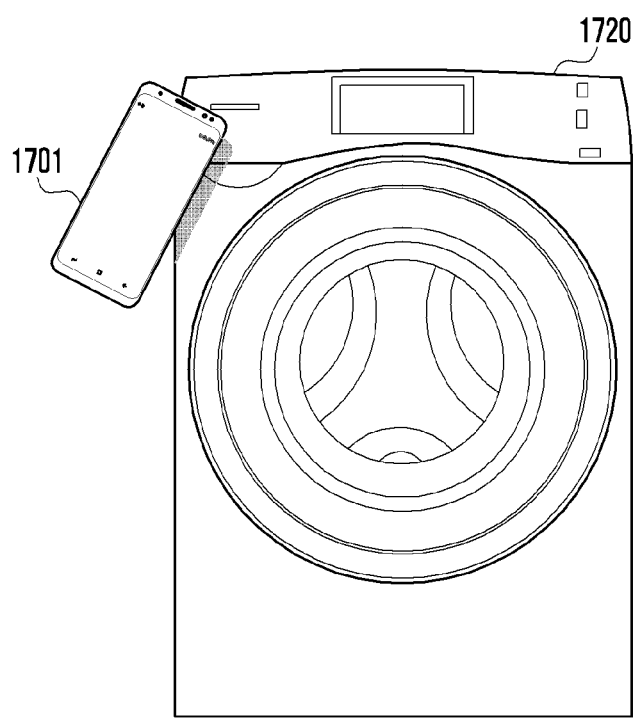
FIG. 17 illustrates a situation of controlling functions of an external electronic device using an electronic device according to various embodiments.

FIG. 17 illustrates a situation of controlling functions of an external electronic device using an electronic device according to various embodiments.

Referring to FIG. 17, according to an embodiment, the electromagnetic wave sensing electronic device may include a wireless communication function and may control the connectivity function with various external electronic devices when the electromagnetic wave sensing electronic device is in contact with or in proximity to the external electronic devices. The connectivity function with the external electronic devices may be set as a function that matches according to the type of the external electronic devices. For example, when the external electronic device is a washing machine 1720 including the communication function, the electromagnetic wave sensing electronic device 1701 may be in contact with or in proximity to the washing machine 1720. For example, the electromagnetic wave sensing electronic device 1701 may detect contact or proximity between devices and make a request for showing operation manual of the washing machine 1720, indicating whether to change detergent supplies, turning off the operation, and starting washing. Then, the washing machine may show operation manual, indicate whether to change detergent supplies, turn off the operation, and start washing in response to the control command transferred from the electromagnetic wave sensing electronic device.

In another example, when the external electronic device is a drying machine, the operation of the drying machine may be started by the contact or proximity with the electromagnetic wave sensing electronic device. When the external electronic device is a refrigerator, temperature of the refrigerator may be controlled by the contact or proximity with the electromagnetic wave sensing electronic device.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a communication module configured to wirelessly communicate with an external electronic device;
    at least one electromagnetic wave reception antenna configured to detect an electromagnetic signal generated from the external electronic device;
    a memory; and
    a processor electrically connected to the communication module, the at least one electromagnetic wave reception antenna, and the memory, wherein the memory stores instructions that, when executed, cause the processor to:
        identify an arrangement location of each electromagnetic wave reception antenna for detecting the electromagnetic signal;
        control the at least one electromagnetic wave reception antenna to receive the electromagnetic signal based on the received electromagnetic signal comprising a predetermined range intensity or a predetermined range frequency characteristic;
        analyze the received electromagnetic signal;
        identify the external electronic device based at least on a result of the analysis;
        identify a type of the electromagnetic signal based at least on the result of the analysis, determine a proximity location between the electronic device and the external electronic device based at least on the identified type of the electromagnetic signal;
        identify one or more predetermined functions corresponding to the determined proximity location and based at least in part on the arrangement location of the each electromagnetic wave reception antenna; and
        perform the one or more predetermined functions.

2. The electronic device of claim 1, wherein the instructions, when executed, cause the processor to identify the one or more predetermined functions based at least on waveform characteristic information of the electromagnetic signal, wherein the waveform characteristic information is classified according to the type of the electronic device or the proximity location.

3. The electronic device of claim 1, wherein the one or more predetermined functions include at least one of a function of the electronic device, a function which can be performed through a link with the external electronic device, or a function which can be performed using at least part of the external electronic device.

4. The electronic device of claim 1, further comprising an electromagnetic wave sensing module configured to:
    perform control to delay a time for an electromagnetic signal received to distinguish between a normal signal and an abnormal signal,
    amplify the time-delayed signal,
    add or subtract the amplified signal to correct it or calculate an envelope of the received electromagnetic signal,
    convert the calculated envelope into a regular signal including a predetermined characteristic, and
    add or subtract an abnormal exception signal from the regular signal to correct it, wherein the electromagnetic wave sensing module transfers the corrected signal to the processor.

5. The electronic device of claim 1, wherein the instructions, when executed, cause the processor to:
    identify a function being executed in the electronic device; and
    execute the one or more predetermined functions in the external electronic device according to waveform characteristic information of the electromagnetic signal in connection with the one or more executed functions.

6. The electronic device of claim 1, wherein:
    the one or more predetermined functions include a connectivity function with the external electronic device, and
    the instructions, when executed, cause the processor to determine a supportable connectivity function based on the identified type of the external electronic device.

7. The electronic device of claim 2, wherein the instructions, when executed, cause the processor to:
    perform a predetermined first function through at least part of the external electronic device based on the electromagnetic signal including a first signal waveform characteristic, and
    perform a predetermined second function through at least part of the external electronic device based on the electromagnetic signal including a second signal waveform characteristic.

8. The electronic device of claim 1, wherein the instructions, when executed, cause the processor to:
    perform a predetermined first function through at least part of the external electronic device based on the electromagnetic signal being detected through a first electromagnetic wave reception antenna arranged at a first location of the electronic device, and
    perform a predetermined second function through at least part of the external electronic device based on the electromagnetic signal being detected through a second electromagnetic wave reception antenna arranged at a second location of the electronic device.

9. The electronic device of claim 1, further comprising a display, wherein the instructions, when executed, cause the processor to perform control to output information related to the predetermined function through the display.

10. The electronic device of claim 5, wherein the instructions, when executed, cause the processor to:
    perform control to execute a first function in the electronic device by a user input request; and execute a function related to the executed first function in the external electronic device according to the result of the analysis of the electromagnetic signal.

11. The electronic device of claim 10, wherein the instructions, when executed, cause the processor to perform control to stop the first function being executed in the electronic device, based on the execution of the function related to the first function in the external electronic device.

12. The electronic device of claim 1, wherein the instructions, when executed, cause the processor to make a communication connection between the electronic device and the external electronic device based on at least one of Wi-Fi communication, Bluetooth communication, NFC communication, and near field communication technology.

13. A method of controlling an external electronic device, based on an electromagnetic signal, by an electronic device, the method comprising:
identifying an arrangement location of each electromagnetic wave reception antenna for detecting the electromagnetic signal within the electronic device;
receiving an electromagnetic signal detected by proximity or contact between the electronic device and the external electronic device;
identifying the external electronic device by analyzing the received electromagnetic signal;
identifying a type of the electromagnetic signal based on a result of the analysis of the electromagnetic signal;
determining a proximity or contact location between the electronic device and the external electronic device based on the identified type of the electromagnetic signal;
identifying one or more predetermined functions corresponding to the determined proximity or contact location, and based at least in part on the arrangement location of the each electromagnetic wave reception antenna; and
performing the one or more predetermined functions.

14. The method of claim 13, wherein:
performing the one or more predetermined functions comprises identifying a function being executed in the electronic device, and
a request for executing the one or more predetermined functions in the external electronic device is made according to waveform characteristic information of the electromagnetic signal in connection with the one or more executed functions.

15. The method of claim 13, wherein performing the one or more predetermined function comprises transferring a command for a connectivity function set according to the identified type of the external electronic device to the external electronic device.

16. The method of claim 13, wherein performing the one or more predetermined functions comprises making a request for performing a predetermined first function through at least part of the external electronic device based on the electromagnetic signal including a first signal waveform characteristic and performing a predetermined second function through at least part of the external electronic device based on the electromagnetic signal including a second signal waveform characteristic.

17. The method of claim 13, further comprising displaying at least one piece of information related to an executed control function and notification information of an execution command on a display after making a request for executing the control function to the external electronic device.

18. The method of claim 14, further comprising:
delaying a time for an electromagnetic signal received to distinguish between a normal signal and an abnormal signal,
amplifying the time-delayed signal,
adding or subtracting the amplified signal to correct the amplified signal or calculating an envelope of the received electromagnetic signal,
converting the calculated envelope into a regular signal including a predetermined characteristic, and
adding or subtracting an abnormal exception signal from the regular signal to correct it, wherein the electromagnetic signal is analyzed based on the corrected electromagnetic signal.

* * * * *